US010705542B1

(12) United States Patent
Kimchi

(10) Patent No.: US 10,705,542 B1
(45) Date of Patent: Jul. 7, 2020

(54) DETERMINING RELATIVE DISTANCES AND POSITIONS OF MULTIPLE VEHICLES FROM TIMES-OF-FLIGHT OF SIGNALS

(71) Applicant: Amazon Technologies, Inc., Seattle, WA (US)

(72) Inventor: Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/637,133

(22) Filed: Jun. 29, 2017

(51) Int. Cl.
| G05D 1/10 | (2006.01) |
| G05D 1/00 | (2006.01) |
| B64C 39/02 | (2006.01) |
| G08G 5/00 | (2006.01) |
| G08G 5/04 | (2006.01) |

(52) U.S. Cl.
CPC ........... G05D 1/104 (2013.01); B64C 39/024 (2013.01); G05D 1/0027 (2013.01); G08G 5/0069 (2013.01); B64C 2201/141 (2013.01); B64C 2201/146 (2013.01); G08G 5/045 (2013.01)

(58) Field of Classification Search
None
See application file for complete search history.

(56) References Cited

U.S. PATENT DOCUMENTS

| 5,596,332 | A * | 1/1997 | Coles ................... G01S 5/0009 342/455 |
| 6,665,631 | B2 * | 12/2003 | Steinbrecher ........... G01S 11/16 342/357.31 |
| 7,511,662 | B2 | 3/2009 | Mathews et al. |
| 9,442,496 | B1 | 9/2016 | Beckman et al. |
| 2009/0118875 | A1 * | 5/2009 | Stroud ................... G01S 5/0027 701/3 |
| 2010/0142448 | A1 * | 6/2010 | Schlicht .................. H04W 4/20 370/328 |
| 2016/0171896 | A1 | 6/2016 | Buchmueller et al. |
| 2016/0247407 | A1 | 8/2016 | Paczan et al. |
| 2016/0370263 | A1 | 12/2016 | Duesterhoft et al. |
| 2017/0006417 | A1 | 1/2017 | Canoy et al. |
| 2017/0176188 | A1 | 6/2017 | Georgy et al. |
| 2017/0234966 | A1 | 8/2017 | Naguib et al. |
| 2018/0074520 | A1 * | 3/2018 | Liu ........................ G05D 1/104 |
| 2018/0173246 | A1 | 6/2018 | Crockett et al. |
| 2019/0035288 | A1 | 1/2019 | Beltman et al. |

\* cited by examiner

*Primary Examiner* — Rami Khatib
(74) *Attorney, Agent, or Firm* — Athorus, PLLC

(57) ABSTRACT

Aerial vehicles may be outfitted with one or more transceivers for transmitting signals between one another. The signals may be time-stamped with times at which the signals are transmitted, and the times at which such signals are received, as determined from global clocks. The times-of-flight of such signals may be calculated from the differences between the times of transmission and the times of receipt, and used to calculate relative distances between the aerial vehicles. Additionally, where two or more of such signals are transmitted by an aerial vehicle, and received by another aerial vehicle, the times-of-flight of such signals may be used to track relative motion or determine an orientation of the aerial vehicle. Such signals may be transmitted and received by any number of vehicles or other objects, and may include any information, data or metadata regarding such vehicles or other objects.

20 Claims, 28 Drawing Sheets

DETERMINING RELATIVE DISTANCES AND POSITIONS OF MULTIPLE VEHICLES FROM TIMES-OF-FLIGHT OF SIGNALS

BACKGROUND

Many modern vehicles (e.g., automobiles or aerial vehicles) or mobile computer devices, such as smartphones, tablet computers or other general or special purpose machines, include one or more components for determining information regarding positions, orientations, velocities or accelerations of such vehicles or devices, and for providing navigational advice or instructions based on such information. For example, some vehicles and computer devices include Global Positioning System (or "GPS") transceivers for determining positions using data received from one or more orbiting satellites, or cellular telephone equipment configured to estimate (e.g., triangulate) a position using signals received from one or more cellular telephone network towers or other network sources.

A GPS-enabled vehicle, device or other system or component may determine its position by interpreting signals that are received from multiple GPS satellites. Where three or more such signals are interpreted, the GPS receiver may be determined to be located at a specific point on the planet to within a certain degree of accuracy or tolerance, commonly on the order of two to ten meters.

Occasionally, position information determined using GPS satellites and GPS-enabled equipment may be inaccurate, irrelevant or unavailable. For example, like any computer device, most GPS-enabled equipment requires an initialization period during which GPS position information obtained or determined by such equipment is unreliable. Furthermore, where an environment includes many natural or artificial obstructions, such as tree limbs, office towers, mountains, walls or ceilings, the receipt of GPS signals by a GPS-enabled device may be delayed or otherwise interpreted as having arrived in an untimely manner.

Moreover, the errors or inaccuracies associated with GPS-determined positions are inherently increased where two or more of such positions are used to determine a relative distance between the positions. For example, where a position of a first GPS-enabled device is determined, and a position of a second GPS-enabled device is determined, each to within two to ten meters of accuracy, a relative distance between the devices calculated based on such positions may be off by as many as twenty meters. The unreliability of relative distances determined based on GPS positions is particularly acute where two or more GPS-enabled devices from which such positions are determined are within short ranges of one another. Where relative distances between two objects are desired, GPS-enabled devices are often ineffective. Furthermore, by itself, a determined position of a GPS-enabled device says nothing about an orientation of the GPS-enabled device, or of a vehicle or other object within which the GPS-enabled device is associated.

DETAILED DESCRIPTION

Figure 1A:
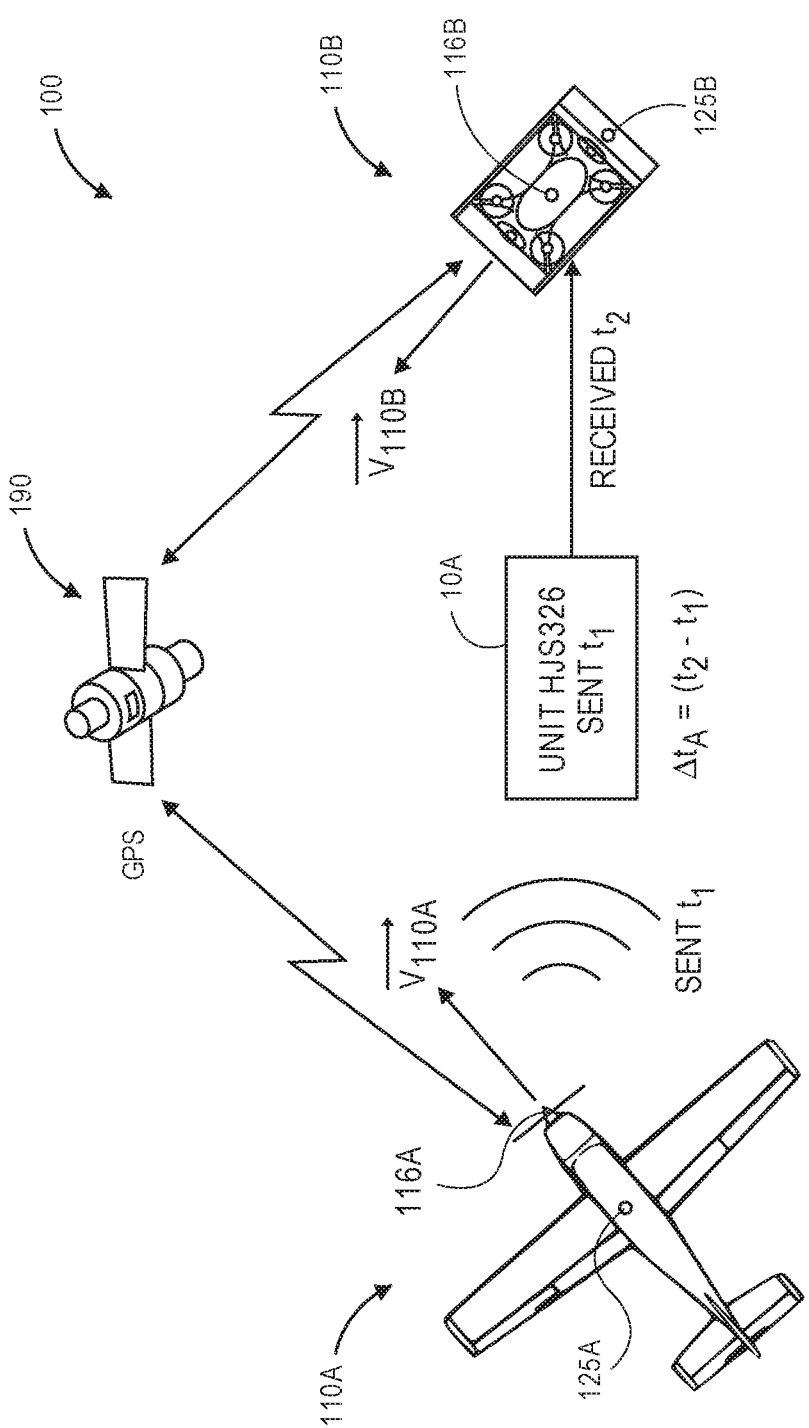
FIGS. 1A through 1D are views of aspects of one system for determining relative distances or orientations of vehicles based on times-of-flight of signals in accordance with embodiments of the present disclosure.

As is set forth in greater detail below, the present disclosure is directed to determining relative distances and/or orientations of two or more vehicles or stations, e.g., aerial vehicles such as unmanned aerial vehicles, or drones. The relative distances may be determined by transmitting a time-stamped signal from a transceiver on one vehicle or station, and determining times at which the time-stamped signal is received by transceivers on one or more other vehicles or stations. The signals that are transmitted and received by vehicles or stations may be any type or form of signal for which a speed of the signal is known or may be determined, including but not limited to radiofrequency (or "RF") signals that are transmitted and received according to any protocol, visible light signals (e.g., optical wireless communication), and acoustic signals transmitted within one or more media. Additionally, times at which such signals are transmitted and received may be determined with precision and accuracy using a global clock, or according to a global time standard. Multiplying a time-of-flight, or a difference between the time at which the signal was transmitted and received, by the speed of the signal may be used to determine a distance between the transmitting transceiver and the receiving transceiver. Additionally, where a first vehicle or station transmits a plurality of time-stamped signals from a transceiver at different times, or from two or more transceivers at the same time, a second vehicle or station that receives such signals may track the relative motion of the first vehicle or station, or to determine an orientation of the second vehicle or station, based on the times-of-flight of each of such signals. Furthermore, the signals may include not only a time-stamp (e.g., a time at which the signal is transmitted), as well as any additional metadata or data, including but not limited to an identifier of a vehicle or a station that transmitted the signal, a specific transceiver on the vehicle or station that transmitted the signal, identifiers of other vehicles or stations and relative distances from the vehicle or station that transmitted the signal to such vehicles or stations, an identifier of a position of the vehicle or station that transmitted the signal, or an association of any of the metadata or data with one or more vehicles, stations and/or objects. The signals may also include checksums or any other metadata or data that may be used to confirm the contents thereof by any transceiver or other receiving component that receives them.

Referring to FIGS. 1A through 1D, views of aspects of one system 100 for determining relative distances or orientations of vehicles based on times-of-flight of signals in accordance with embodiments of the present disclosure are shown. The system 100 includes a first aerial vehicle 110A traveling at a velocity $V_{110A}$ and a second aerial vehicle 110B traveling at a velocity $V_{110B}$. The first aerial vehicle 110A includes a first transceiver 116A provided in a propeller or nose of the first aerial vehicle 110A, and the second aerial vehicle 110B includes a second transceiver 116B provided on a wing or other aspect at a tail of the second aerial vehicle 110B. Each of the first aerial vehicle 110A and the second aerial vehicle 110B includes a GPS sensor 125A, 125B that is configured to receive signals from one or more satellites of a GPS system 190.

As is shown in FIG. 1A, the first aerial vehicle 110A transmits a first signal 10A by the first transceiver 116A at a first time $t_1$. The first signal 10A may be any type or form of electromagnetic signal that may be transmitted or received according to any protocol, including but not limited to a radiofrequency signal such as a Wireless Fidelity (or "Wi-Fi") signal or a Bluetooth® signal, a visible light signal (or "Li-Fi"), or the like. Alternatively, in some other embodiments, the first signal 10A may be an acoustic signal. The first signal 10A may be open and unencrypted, or subject to one or more forms or levels of encryption.

The first signal 10A includes an identifier of the first aerial vehicle 110A and/or the first transceiver 116A (viz., HJS326), as well as a time-stamp, or a digital record of a time at which the first signal 10A was transmitted (viz., the first time $t_1$). The time-stamp may be determined by a global clock associated with the GPS system 190, e.g., based on a GPS signal received by the GPS sensor 125A, or from any other global clock or according to any global time standard. As is also shown in FIG. 1A, the second aerial vehicle 110B receives the first signal 10A by the second transceiver 116B at a second time $t_2$. The second time $t_2$ at which the first signal 10A was received may also be determined by a global clock associated with the GPS system 190, e.g., based on a GPS signal received by the GPS sensor 125B, or from any other global clock or according to any global time standard. A time-of-flight of the first signal 10A, or $\Delta t_A$, is calculated by subtracting the second time $t_2$ at which the first signal 10A was received by the second transceiver 116B from the first time $t_1$ at which the first signal 10A was transmitted by the first transceiver 116A, or $(t_2-t_1)$.

Figure 1B:
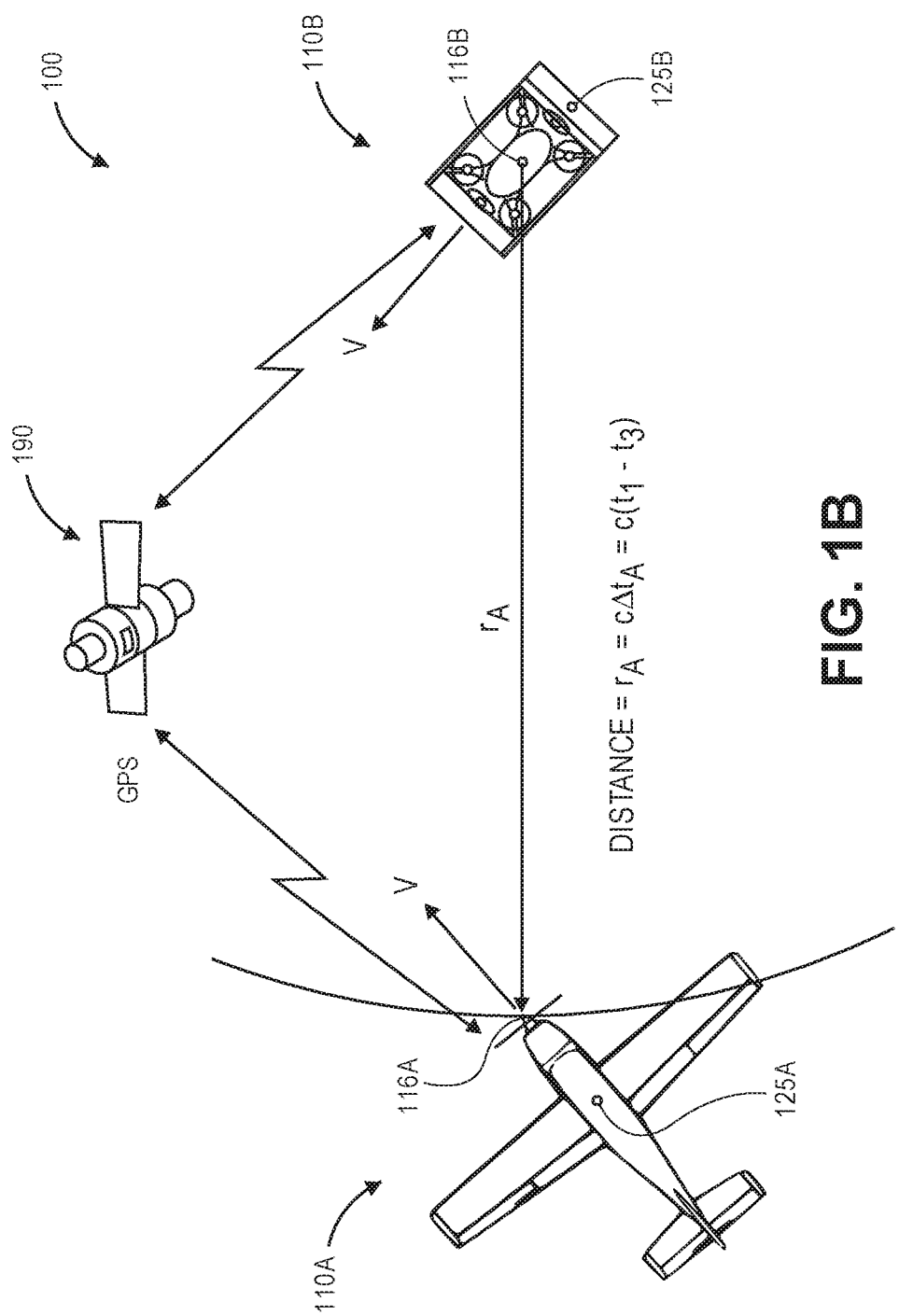

As is shown in FIG. 1B, a relative distance $r_A$ between the first transceiver 116A and the second transceiver 116B is calculated as a product of the speed of light c, viz., 299,792,458 meters per second (or approximately $3.0 \times 10^8$ m/s), or 186,000 miles per second, and the time-of-flight of the first signal 10A, or $\Delta t_A$. The relative distance $r_A$ between is expressed as a radius extending from the second transceiver 116B that received the first signal 10A.

Figure 1C:
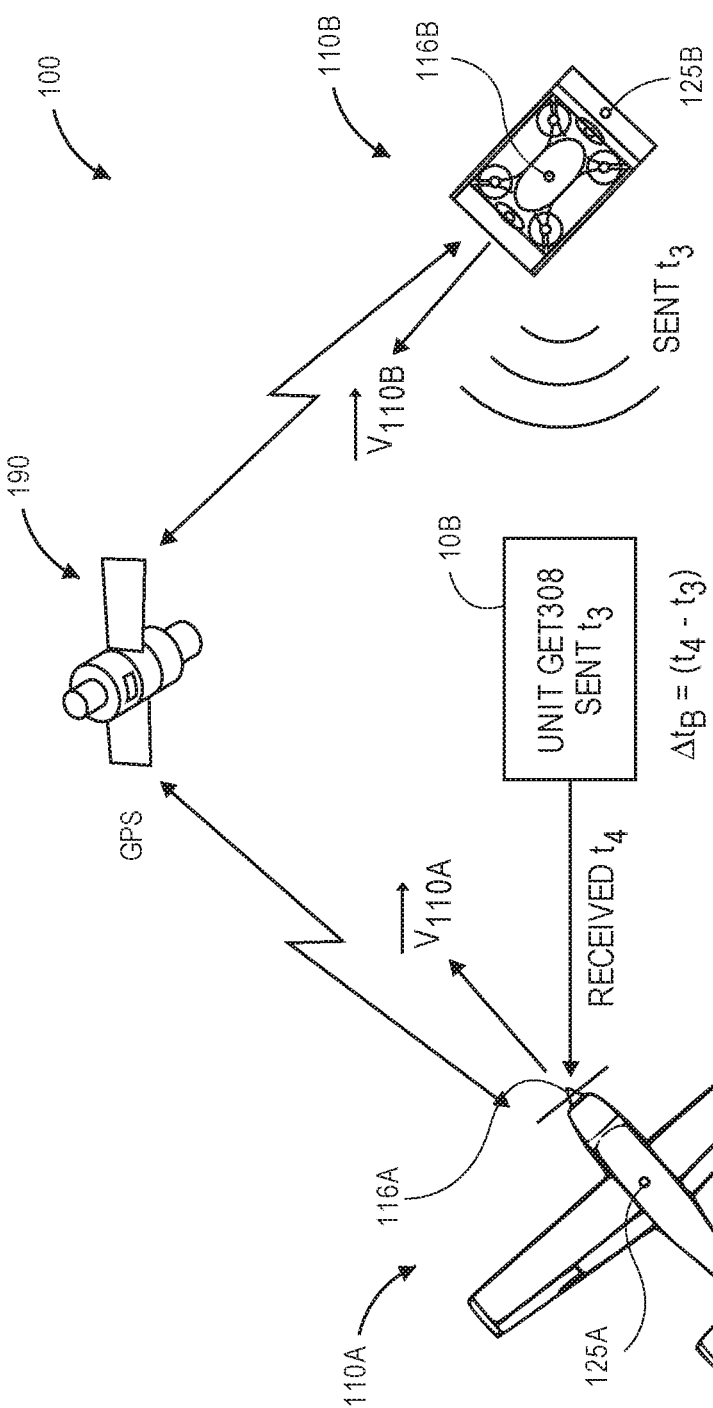

After the second aerial vehicle 110B has determined the relative distance $r_A$ based on its receipt of the first signal 10A from the first aerial vehicle 110A, the second aerial vehicle 110B may respond in kind. As is shown in FIG. 1C, the second aerial vehicle 110B transmits a second signal 10B by the second transceiver 116B at a third time $t_3$. Like the first signal 10A, the second signal 10B may also be any type or form of electromagnetic signal that may be transmitted or received according to any protocol, such as the same protocol as the first signal 10A was transmitted or received, or a different protocol. In some other embodiments, the second signal 10B may be an acoustic signal. Additionally, the second signal 10B may be open and unencrypted, or subject to one or more forms or levels of encryption.

The second signal 10B includes an identifier of the second aerial vehicle 110B (viz., GET308), as well as a time-stamp, or a digital record of a time at which the second signal 10B was transmitted (viz., the third time $t_3$). The time-stamp may be determined by a global clock associated with the GPS system 190, e.g., based on a GPS signal received by the GPS sensor 125B, or from any other global clock or according to any global time standard. As is also shown in FIG. 1C, the first aerial vehicle 110A receives the second signal 10B by the first transceiver 116A at a fourth time $t_4$. The fourth time $t_4$ at which the second signal 10B was received may also be determined by a global clock associated with the GPS system 190, e.g., based on a GPS signal received by the GPS sensor 125A, or from any other global clock or according to any global time standard. A time-of-flight of the second signal 10B, or $\Delta t_B$, is calculated by subtracting the fourth time $t_4$ at which the second signal 10B was received by the first transceiver 116A from the third time $t_3$ at which the second signal 10B was transmitted by the second transceiver 116B, or $(t_4-t_3)$.

Figure 1D:
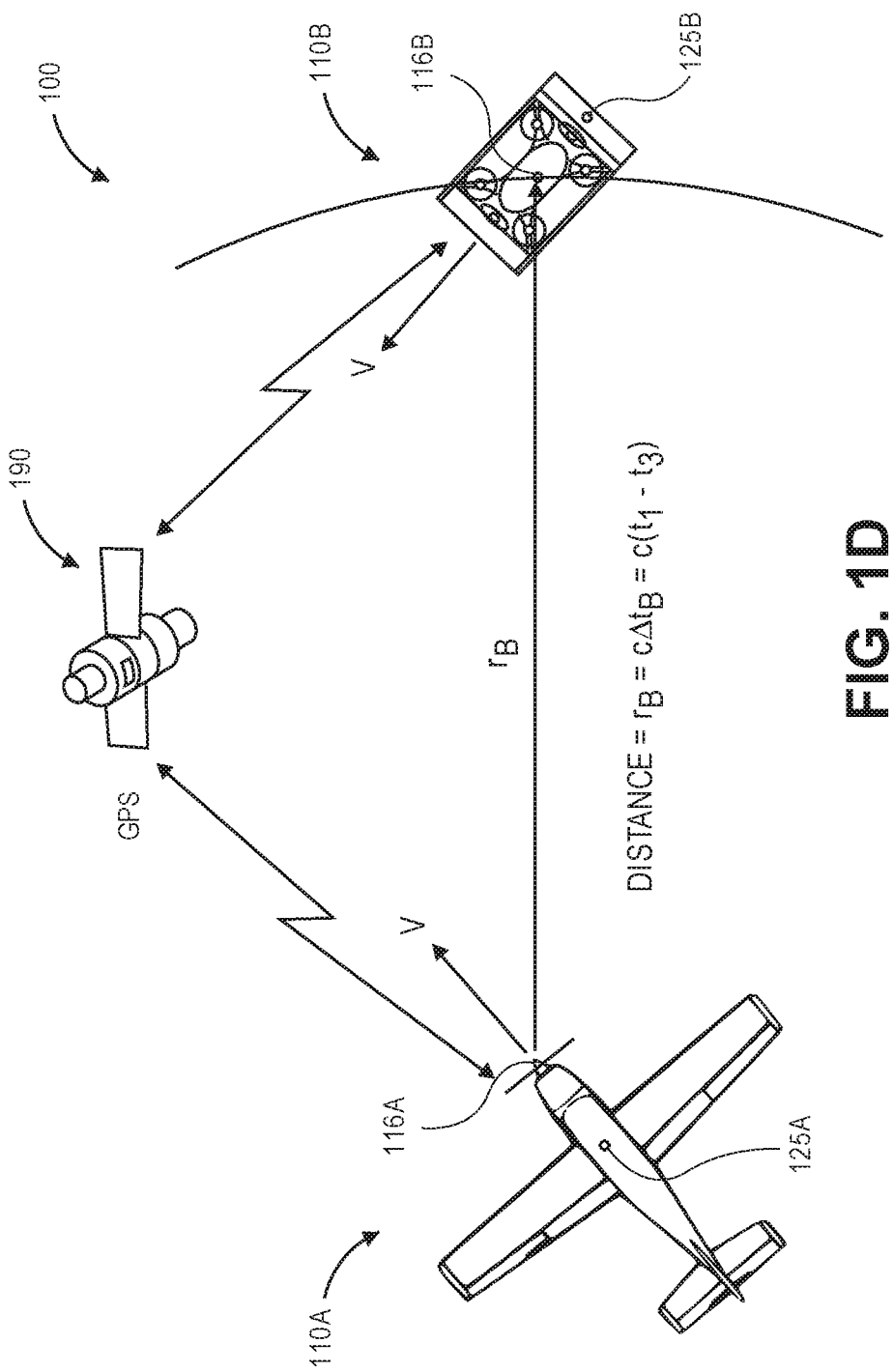

As is shown in FIG. 1D, a relative distance $r_B$ between the second transceiver 116B and the first transceiver 116A is calculated as a product of the speed of light c, and the time-of-flight of the first signal 10B, or $\Delta t_B$. The relative distance $r_B$ between is expressed as a radius extending from the first transceiver 116A that received the second signal 10B.

Accordingly, the systems and methods of the present disclosure are directed to determining relative distances between pairs of vehicles, stations or other objects based on times at which signals are transmitted and received by corresponding components of such vehicles, stations or objects. Additionally, where a vehicle, a station or an object includes two or more transmitting and/or receiving components, the transmission and/or receipt of such signals by such components may be used to determine relative distances to portions of the vehicle, the station or the object where such components are located and, therefore, to define an orientation of the vehicle, the station or the object. Moreover, where a relative distance between a pair of vehicles, stations or other objects is determined over time, e.g., based on times-of-flight of such signals, a position of a first vehicle, a first station or a first object may be determined and tracked if a position and/or velocity of a second vehicle, a second station or a second object is known.

Currently, some computer devices, or systems, vehicles or persons that are equipped with such devices (e.g., automobiles and/or aerial vehicles having one or more onboard devices, or pedestrians, cyclists or other individuals bearing a mobile device such as a smartphone or tablet computer), may determine their respective positions using various means or methods. For example, a mobile computer device may include a locating module that obtains a geocode or other data regarding a location of the mobile computer device at an associated level of accuracy or tolerance. Most commonly, computer devices include GPS sensors, microchips or other components that determine locations by interpreting signals received from one or more GPS satellites. In the United States, the GPS system comprises twenty-four satellites that circle the planet every twelve hours at an altitude of approximately eleven thousand nautical miles, and are maintained aloft by the United States Air Force. GPS-equipped computer devices typically operate by measuring the transit times of signals received from multiple satellites, which generally travel at the speed of light, and determining distances to the respective satellites based on the transit times. Using three or more such signals, an approximate position of a computer device may be determined to within a defined degree or level of accuracy. By some estimates, American GPS satellites may provide users with an accuracy level of approximately 7.8 meters (m), ninety-five percent of the time, anywhere around the planet. Other positioning systems, such as the Global Navigation Satellite System (or "GLONASS") operated by Russia, the Galileo GNSS System operated by the European Space Agency, or the BeiDou Navigation Satellite System operated by China, also rely on satellites to provide position data to ground-based receivers.

Positioning systems, such as the GPS system, the GLONASS system or the Galileo GNSS system, operate according to global standards of time, through the use of global clocks. For example, in the GPS system, each of the GPS satellites includes an onboard atomic clock therein, while each GPS-enabled device includes a quartz clock, or another like clock, that may be updated on a regular or as-needed basis. When a GPS-enabled device receives position signals from one or more GPS satellites, the GPS-enabled device may synchronize its clock, if necessary, to a true and accurate measure of time according to a global time standard. Therefore, although atomic clocks tend to be extremely expensive, a GPS-enabled device may exploit the advantages of precision and accuracy of atomic clocks at a fraction of the cost. Some global time standards include Global Positioning System Time (or "GPST"), GLONASS Time (or "GLONASST"), Galileo System Time (or "GST"), BeiDou Time (or "BDT"), International Atomic Time (or "TAI"), or Coordinated Universal Time (or "UTC").

The systems and methods of the present disclosure are directed to determining relative distances and/or orientations of two or more vehicles, stations or other objects with respect to one another based on the transmission and receipt of signals by and between the vehicles, the stations or the other objects. Where a signal includes a time stamp generated by a transmitting device, a relative distance between the transmitting device and a receiving device may be determined by the receiving device upon receipt of the signal based on a product of the signal's time-of-flight and the speed of the signal (e.g., the speed of light, for a radiofrequency signal or other electromagnetic signal). The precision and accuracy of such systems and methods may be enhanced where the time stamp, and the time of receipt, are determined using one or more global clocks, including but not limited to global clocks associated with the GPS system, and maintained according to a global time standard. Additionally, where each of a pair of vehicles, stations or other objects includes a plurality of transmitting and/or receiving components, relative distances between such components may be determined based on times-of-flight of signals transmitted between such components. Moreover, the relative distances may be utilized in predicting or determining an orientation of a vehicle, a station or another object from which one or more signals is received. For example, the relative distances may also be utilized along with position data and/or velocity data of a vehicle, a station or another object that received one or more signals in order to predict or determine a position or velocity of a vehicle, a station or another object that transmitted such signals.

The one or more signals that are transmitted and received in accordance with the present disclosure may be open and unencrypted, and thereby subject to capture and interpretation by any vehicles, stations or objects that are so configured and are within a signal range. Alternatively, the one or more signals may be subject to any form or level of encryption, and targeted for use by vehicles, stations or objects that are programmed to encrypt the signals upon their receipt. In some embodiments, the one or more signals may be radiofrequency (or "RF") signals that are transmitted and received according to any protocol. Such signals may have any amplitude and/or phase, and may have a frequency residing generally within a range between approximately three kilohertz and approximately three hundred gigahertz (or 3 kHz to 300 GHz). For example, the signals may be Wi-Fi signals, Bluetooth® signals, amplitude modification (AM) radio signals, frequency modulation (FM) signals, or any other signals residing within similar frequency spectra. The one or more signals may also be light-based or optical signals, such as emissions of light specifically programmed, timed or scheduled flickers from light-emitting diodes (or "LED") or other light sources, that are encoded with information or data that may be captured and interpreted by one or more optical sensors. The one or more signals may also be acoustic signals, such as tones that may be emitted at predetermined intensities and/or within predetermined frequency spectra and encoded with information or data that may be captured and interpreted by one or more acoustic sensors. Times at which such signals are transmitted and received may be determined with precision and accuracy through the use of a global clock or according to a global time standard. Accordingly, the signals may be transmitted and/or received by any components that are configured to transmit and/or receive such signals. Moreover, the signals may be transmitted by discrete transmitting components, received by discrete receiving components, or transmitted and received by transceivers or other components that are configured to not only transmit but also receive such signals.

Transmitting and/or receiving components may be provided in any location with respect to any aspect of a vehicle, a station or another object. For example, referring again to FIGS. 1A through 1D, the transceiver 116A is disposed within a tip of a propeller of the first aerial vehicle 110A, while the transceiver 116B is disposed in association with a centrally located control system within the aerial vehicle 110B. Transmitting and/or receiving components may be provided in any other location of a vehicle, a station or another object, including but not limited to control surfaces, fuselages, landing gear components, wheels, axles, cabins, airframes or the like. Transmitting and/or receiving components may also be provided in one or more orbiting satellites or ground-based stations. Transmitting and/or receiving components may further be worn by, or mounted or affixed to, one or more humans or other animals, as necessary.

In some embodiments of the present disclosure, a vehicle, a station or another object may be configured to transmit one or more time-stamped signals on a regular or irregular basis, e.g., according to a predetermined schedule, or at any other time. For example, an aerial vehicle that is outfitted with one or more transceivers or other transmitting or receiving components may transmit such signals periodically to determine whether any similarly equipped aerial vehicles or other objects is within a signal range of such signals. Similarly, an aerial vehicle may also be configured to persistently monitor for such signals, or to monitor for such signals periodically or at regularly scheduled times. Additionally, an aerial vehicle may be configured to receive a time-stamped signal transmitted by another aerial vehicle, and to respond to the time-stamped signal by transmitting a time-stamped signal of its own, such as is shown in FIGS. 1A through 1D. In this regard, each of the aerial vehicles may determine a relative distance between them, as of the times of their receipt of the respective signals. Vehicles, stations and/or objects that are outfitted with one or more transmitting or receiving components may be configured to generate and transmit, and/or monitor for and receive, signals of any type or form, and may interpret information or data included in such signals to determine relative distances to one or more other vehicles, stations or objects accordingly.

As is discussed above, one or more of the signals transmitted in accordance with the present disclosure may be time-stamped with a time determined by a global clock, such as a GPS system, according to a global time standard. Additionally, such signals may include additional content. For example, a signal may include an identifier of a vehicle, a station or an object from which the signal was transmitted, or an identifier of a specific transceiver that transmitted the signal, as well as one or more indicators of an association between the signal and the vehicle, the object or the transceiver, in addition to a time-stamp. Any additional content that is included in a signal, or any other information or data, may be utilized in connection with the time-stamp to make one or more determinations regarding a relative distance between two or more vehicles, stations or objects (e.g., aerial vehicles), or an orientation of one or more of the vehicles, stations or objects, or any other factors regarding any of the vehicles, stations or objects. For example, where a position and/or a velocity of one aerial vehicle is known to a sufficiently high degree of certainty, and relative distances between the aerial vehicle and another aerial vehicle are determined over time, a position and/or a velocity of the other aerial vehicle may be determined according to dead reckoning or one or more other tracking techniques. Furthermore, an orientation of a vehicle, a station or an object (e.g., an aerial vehicle) from which one or more time-stamped signals is received may be determined based on any information or data that is known regarding the vehicle, the station or the object. For example, where a time-stamped signal includes an identifier indicating that the signal was transmitted by a transceiver disposed in a port wing of a specific model of aerial vehicle, relative distances to one or more other aspects of the aerial vehicle, or an orientation of the aerial vehicle, may be predicted or determined based on information or data that may be known regarding a configuration of the aerial vehicle. A relative distance to a starboard wing tip, for example, may be predicted or determined based on the relative distance to the known location of the transceiver within the port wing and a known distance between the transceiver and the starboard wing tip. A signal may include one or more identifiers or associations of any of the information or data included therein with one or more of the vehicles, stations or objects referenced therein.

In accordance with the present disclosure, and in addition to time stamps, signals that are transmitted by a vehicle, a station or another object may further include information or data regarding relative distances to one or more other vehicles, stations or objects. For example, a time-stamped signal transmitted by a vehicle, a station or another object may be encoded to include identifiers of each of the other vehicles, stations or objects from which the vehicle, the station or the object received time-stamped signals, as well as relative distances to such vehicles, stations or other objects, and times at which such signals were received. Thus, when another vehicle, station or object receives the time-stamped signal, the other vehicle, station or object learns not only a relative distance to the vehicle, station or object that transmitted the time-stamped signal, e.g., based on a product of the time-of-flight of the signal and a speed at which the signal traveled, but also relative distances from that vehicle, station or object to any number of other vehicles, stations or objects, and times at which such relative distances were determined. Moreover, when a vehicle, a station or an object is aware of its position to a sufficiently high degree of certainty, a signal transmitted by the vehicle, the station or the object may include its position, and the relative or absolute positions of other vehicles, stations or objects determined based on that position.

Figure 2:
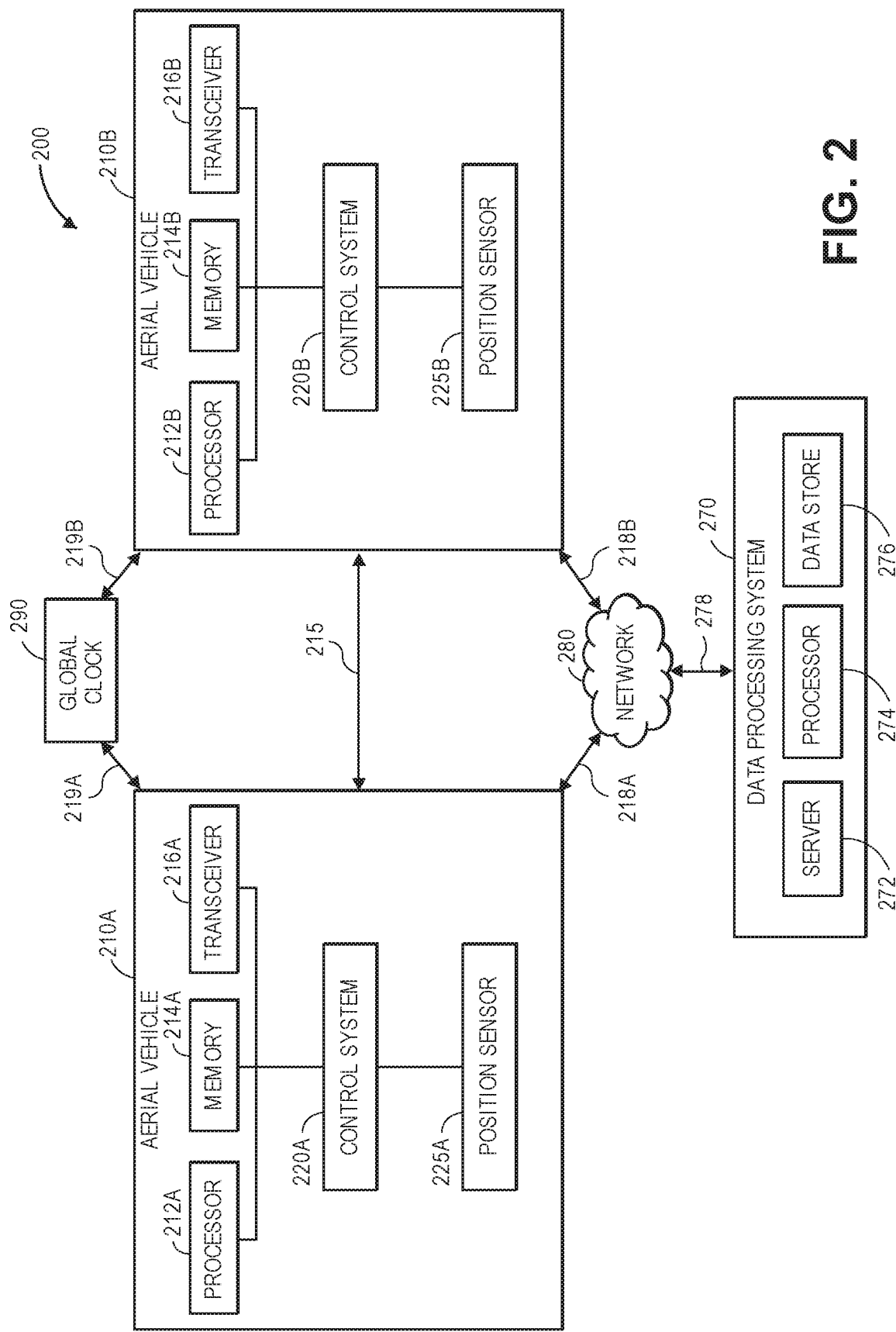
FIG. 2 is a block diagram of one system for determining relative distances or orientations of vehicles based on times-of-flight of signals in accordance with embodiments of the present disclosure.

Referring to FIG. 2, a block diagram of one system 200 for determining relative distances or orientations of vehicles based on times-of-flight of signals in accordance with embodiments of the present disclosure is shown. The system 200 of FIG. 2 includes an aerial vehicle 210A, an aerial vehicle 210B and a data processing system 270 that are connected to one another over a network 280, which may include the Internet, in whole or in part. The system 200 further includes a global clock 290, which may be associated with one or more satellites or other components of a GPS system, and may be configured to maintain time according to a global time standard. Except where otherwise noted, reference numerals preceded by the number "2" shown in FIG. 2 indicate components or features that are similar to components or features having reference numerals preceded by the number "1" shown in FIGS. 1A through 1D.

As is shown in FIG. 2, the aerial vehicle 210A and the aerial vehicle 210B are similarly configured. The aerial vehicle 210A includes a processor 212A, a memory 214A and a transceiver 216A. The aerial vehicle 210A further includes a control system 220A and a position sensor 225A. Likewise, the aerial vehicle 210B includes a processor 212B, a memory 214B and a transceiver 216B. The aerial vehicle 210B further includes a control system 220B and a position sensor 225B. Additionally, the aerial vehicles 210A, 210B may each include any number of other components, including but not limited to airframes, propulsion motors, propellers, control surfaces, item engagement systems, landing gear components, lighting systems, imaging devices or other operational or environmental sensors.

The processors 212A, 212B may be configured to perform any type or form of computing function, including but not limited to the execution of one or more machine learning algorithms or techniques. For example, the processors 212A, 212B may control any aspects of the operation of the aerial vehicles 210A, 210B and any computer-based components thereon, including but not limited to propulsion motors, propellers, control surfaces, item engagement systems, landing gear components, lighting systems, imaging devices or other operational or environmental sensors. For example, the processors 212A, 212B may control the operation of one or more control systems or modules, such as the control systems 220A, 220B, for generating instructions for conducting operations of the aerial vehicles 210A, 210B, including but not limited to instructions for causing propulsion motors to operate at a predetermined or selected speed, for causing propellers to rotate at a predetermined or selected pitch or configuration, or for causing one or more sensors to capture information or data of any type or form. Similarly, the processors 212A, 212B may control the operation of one or more control surfaces (not shown), including but not limited to wings, rudders, ailerons, elevators, flaps, brakes, slats or other features. Such control systems or modules may be associated with one or more other computing devices or machines, and may communicate with the data processing system 270 or one or more other computer devices (not shown) over the network 280, through the sending and receiving of digital data, as indicated by lines 218A, 218B.

The processors 212A, 212B may be a uniprocessor system including one processor, or a multiprocessor system including several processors (e.g., two, four, eight, or another suitable number), and may be capable of executing instructions. For example, in some embodiments, the processors 212A, 212B may be a general-purpose or embedded processor implementing any of a number of instruction set architectures (ISAs), such as the x86, PowerPC, SPARC, or MIPS ISAs, or any other suitable ISA. Where one or more of the processors 212A, 212B is a part of a multiprocessor system, each of the processors within the multiprocessor system may implement the same ISA, or different ISAs.

Additionally, the memory or storage components 214A, 214B (such as databases or data stores) are configured for storing any type of information or data, e.g., instructions for operating the aerial vehicles 210A, 210B, or information or data captured during operations of the aerial vehicles 210A, 210B. The memory components 214A, 214B may be configured to store executable instructions, flight paths, flight control parameters and/or other data items accessible by or to the processors 212A, 212B. The memory components 214A, 214B may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 216A, 216B, e.g., by transmission media or signals, such as electrical, electromagnetic, or digital signals, which may be conveyed via a communication medium such as a wired and/or a wireless link.

The transceivers 216A, 216B may be configured to enable the aerial vehicles 210A, 210B to communicate through one or more wired or wireless means, e.g., wired technologies such as Universal Serial Bus (or "USB") or fiber optic cable, or standard wireless protocols, such as over the network 280 or directly. In some embodiments, the transceivers 216A, 216B may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 216A, 216B may be configured to transmit and receive light signals, and may include one or more light emitting diode (or "LED") transmitters and/or one or more optical sensors or receivers. In still other embodiments, the transceivers 216A, 216B may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. In accordance with the present disclosure, each of the transceivers 216A, 216B may be configured to transmit signals to one another, or receive signals from one another, as indicated by line 215. Such signals may be open and unencrypted, and captured and interpreted by any vehicle, station or object within a signal range of the transceivers 216A, 216B, or subject to any form or level of encryption.

The transceivers 216A, 216B may further include or be in communication with one or more input/output (or "I/O") interfaces, network interfaces and/or input/output devices, and may be configured to allow information or data to be exchanged between one or more of the components of the aerial vehicles 210A, 210B, or to one or more other computer devices or systems (e.g., other aerial vehicles, not shown) via the network 280. For example, in some embodiments, the transceivers 216A, 216B may be configured to coordinate I/O traffic between the processors 212A, 212B and one or more onboard or external computer devices or components. The transceivers 216A, 216B may perform any necessary protocol, timing or other data transformations in order to convert data signals from a first format suitable for use by one component into a second format suitable for use by another component. In some embodiments, the transceivers 216A, 216B may include support for devices attached through various types of peripheral buses, e.g., variants of the Peripheral Component Interconnect (PCI) bus standard or the Universal Serial Bus (USB) standard. In some other embodiments, functions of the transceivers 216A, 216B may be split into two or more separate components, or integrated with the processors 212A, 212B. Although the transceivers 216A, 216B are shown as single components for transmitting and/or receiving information or data, those of ordinary skill in the pertinent arts will recognize that the aerial vehicles 210A, 210B may each include any number of transceivers, or, alternatively or additionally, any number of transmitting and/or receiving devices that may be provided as discrete components.

The control systems 220A, 220B may include one or more electronic speed controls, power supplies, navigation systems and/or payload engagement controllers for controlling the operation of the aerial vehicles 210A, 210B and for engaging with or releasing items (not shown), as desired. For example, the control systems 220A, 220B may be configured to cause or control the operation of one or more of propulsion motors, propellers, sensors or other aspects of the aerial vehicles 210A, 210B, such as to cause one or more of propulsion motors to rotate propellers at a desired speed, in order to guide the aerial vehicles 210A, 210B along a determined or desired flight path, or to perform any other function. The control systems 220A, 220B may further control other aspects of the aerial vehicles 210A, 210B, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control systems 220A, 220B may be integrated with one or more of the processors 212A, 212B, the memory components 214A, 214B and/or the transceivers 216A, 216B.

The position sensors 225A, 225B may be any system or component for determining information or data regarding a position of the aerial vehicles 210A, 210B, e.g., in real time or near-real time. Additionally, or alternatively, the position sensors 225A, 225B may also be configured to determine true and accurate times based on one or more signals received from the global clock 290. Information or data regarding positions of the aerial vehicles 210A, 210B may include, but is not limited to, one or more geolocations, or geospatially-referenced points that precisely define locations of the aerial vehicles 210A, 210B in space using one or more geocodes, such as a set of coordinates, e.g., a latitude and a longitude and, optionally, an elevation of the aerial vehicles 210A, 210B. Alternatively, or additionally, the position sensors 225A, 225B may be configured to determine positions of the aerial vehicles 210A, 210B forensically, such as after a mission has been completed. For example, in some embodiments, the position sensors 225A, 225B may be or include a GPS receiver in communication with one or more orbiting satellites or other components of a GPS system that is configured to receive geolocations and/or geocodes from such satellites, and such satellites or other components may comprise the global clock 290 in whole or in part. The position sensors 225A, 225B may also be or include an imaging device that is configured to capture one or more images, and to determine positions and/or velocities of the aerial vehicles 210A, 210B based on such images, e.g., according to one or more visual odometry techniques. The position sensors 225A, 225B may also be or include a laser device configured to emit one or more laser beams or signals, and to determine a position and/or velocity of the aerial vehicles 210A, 210B based on differences between scans of such beams or signals. The position sensors 225A, 225B may also be or include an inertial system including one or more sensors such as accelerometers and/or gyroscopes for sensing motion and/or orientations of the aerial vehicles 210A, 210B. The position sensors 225A, 225B may be or include a cellular transmitter and/or receiver, e.g., one or more component parts of the transceivers 216A, 216B, which may determine a position of the aerial vehicles 210A, 210B by triangulation of signals received from multiple cellular transmission towers (preferably at least three of such towers).

The global clock 290 may be any clock devices or systems that maintains an accurate and reliable time according to a global time standard, and may provide the time to one or more devices, e.g., the processors 212A, 212B, the position sensors 225A, 225B or any other aspects of the aerial vehicles 210A, 210B. In some embodiments, the global clock 290 may be or include one or more atomic clocks. In some embodiments, the global clock 290 may be or include atomic clocks provided aboard one or more orbiting satellites of the GPS system, or of any other positioning system.

As is discussed above, in some embodiments, the aerial vehicles 210A, 210B may each include one or more propulsion motors (e.g., electric, gasoline-powered or any other motor) joined to an airframe and capable of generating sufficient rotational speeds of corresponding propellers or other components to provide lift and/or thrust forces to the aerial vehicles 210A, 210B and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicles 210A, 210B may be of any kind, and may be dedicated to one or more purposes or functions. For example, one or more of the propulsion motors may be aligned or configured to provide forces of lift to the aerial vehicles 210A, 210B, exclusively, while one or more of the propulsion motors may be aligned or configured to provide forces of thrust to the aerial vehicles 210A, 210B, exclusively. Alternatively, one or more of the propulsion motors may be aligned or configured to provide forces of lift and/or forces of thrust to the aerial vehicles 210A, 210B, as needed. For example, such propulsion motors may be fixed in their orientation on the aerial vehicles 210A, 210B, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 212A, 212B, the control systems 220A, 220B, or any other aspect of the aerial vehicles 210A, 210B.

Additionally, the propulsion motors of the aerial vehicles 210A, 210B may be coupled to one or more propellers, e.g., any rotors or rotatable systems having a plurality of shaped blades joined to a hub or boss. Each of such propellers may be rotatably mounted to a mast or shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 212A, 212B, the control systems 220A, 220B, or any other aspect of the aerial vehicles 210A, 210B.

The aerial vehicles 210A, 210B may also include any number of other sensors, components or other features for controlling or aiding in the operation of the aerial vehicles 210A, 210B, including but not limited to one or more environmental or operational sensors for determining one or more attributes or characteristics of an environment in which the aerial vehicles 210A, 210B is operating, or may be expected to operate, including extrinsic information or data or intrinsic information or data. Such sensors may be mounted to or associate with airframes of the aerial vehicles 210A, 210B. For example, the aerial vehicles 210A, 210B may include imaging devices (e.g., digital cameras), microphones or other acoustic sensors, compasses, speedometers, altimeters, thermometers, barometers, hygrometers, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, or sound sensors (e.g., microphones, piezoelectric sensors, vibration sensors or other transceivers for detecting and recording acoustic energy from one or more directions). Such sensors, components or other features may be controlled by the processors 212A, 212B, the control systems 220A, 220B, or any other aspect of the aerial vehicles 210A, 210B.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding positions, velocities (e.g., speeds or directions) or other information or data received from the aerial vehicles 210A, 210B or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicles 210A, 210B, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, one or more components of the data processing system 270 may be provided onboard one or more aerial vehicles, including but not limited to the aerial vehicles 210A, 210B.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicles 210A, 210B and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicles 210A, 210B may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicles 210A, 210B or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212A, 212B, the control systems 220A, 220B or the processor 274, or any other computers or control systems utilized by the aerial vehicles 210A, 210B or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
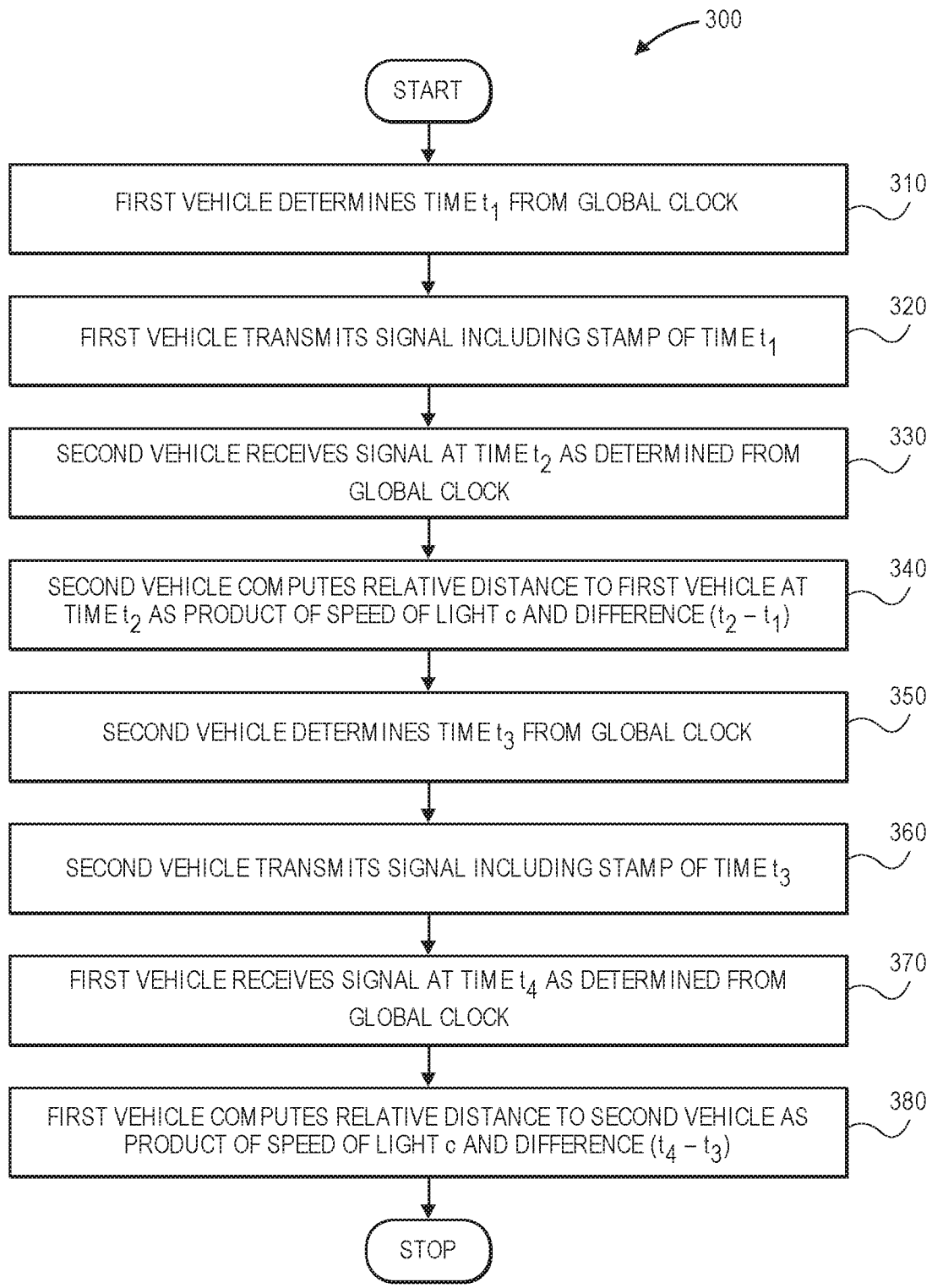
FIG. 3 is a flow chart of one process for determining relative distances between vehicles based on times-of-flight of signals in accordance with embodiments of the present disclosure.

As is discussed above, some embodiments of the present disclosure may be directed to determining relative distances between two objects (e.g., vehicles or stations) based on signals transmitted and received by such objects. Referring to FIG. 3, a flow chart 300 of one process for determining relative distances between vehicles based on times-of-flight of signals in accordance with embodiments of the present disclosure is shown. At box 310, a first vehicle (e.g., an aerial vehicle) determines a time $t_1$ from a global clock. For example, the first vehicle may be equipped with a GPS receiver, and the time $t_1$ may be determined based on position signals received from one or more GPS satellites, according to a global time standard. Alternatively, any other type or form of global clock (e.g., an atomic clock) may be utilized to determine the time $t_1$ according to a global time standard.

At box 320, the first vehicle transmits a signal including a time stamp indicating that the signal was transmitted at the time $t_1$. The signal may be a radiofrequency signal (e.g., a Wi-Fi or Bluetooth® signal) that is transmitted randomly, at a predetermined time, in accordance with a predetermined schedule, or in response to receiving another signal. Alternatively, in some other embodiments, the signal may be an optical light signal, or an acoustic signal. Additionally, the signal may be transmitted by a transceiver or other transmitting device provided in any location or position on the first vehicle, either independently or simultaneously or nearly simultaneously along with one or more signals. Moreover, the signal may be encoded to include any additional data or metadata, in addition to the time stamp. For example, the signal may identify the first vehicle, or a specific transmitting device or component from which the signal was transmitted, as well as a position of the first vehicle, or relative distances to one or more other vehicles, stations or objects, or a checksum or any other digit or code for confirming the accuracy or authenticity of the content therein.

At box 330, the second vehicle receives the signal at a time $t_2$, as determined from the global clock. The signal may be received by a single transceiver or other receiving component provided on the second vehicle, or by multiple transceivers or other receiving components disposed in different locations on the second vehicle. At box 340, the second vehicle computes a relative distance to the first vehicle at the time $t_2$ based on a product of the speed of light c and a difference between the time $t_2$ and the time $t_1$, or $(t_2-t_1)$. Multiplying the speed of light c by the difference $(t_2-t_1)$, e.g., the time-of-flight of the signal, results in a distance between a transceiver or other transmitting device on the first vehicle from which the signal was transmitted and a transceiver or other receiving component on the second vehicle. Alternatively, where the signal is an acoustic signal, the time-of-flight of the signal may be multiplied by a speed of sound in the medium provided between the first vehicle and the second vehicle. For example, in air at a temperature of approximately sixty-eight degrees Fahrenheit (68° F.), or approximately twenty degrees centigrade (20° C.), the speed of sound is approximately 1,125 feet per second (1,125 ft/s) or approximately 343 meters per second (343 m/s).

At box 350, the second vehicle determines a time $t_3$ from the global clock, and at box 360, the second vehicle transmits a signal including a stamp of the time $t_3$. The signal may be a radiofrequency signal that is transmitted randomly or on any basis, including but not limited to the receipt of the signal by the second vehicle at box 330. The signal may be transmitted by a transceiver or other transmitting device provided in any location or position on the first vehicle, either independently or simultaneously or nearly simultaneously along with one or more signals. Moreover, the signal may include any additional data or metadata, in addition to the time stamp, e.g., an identifier of the second vehicle, or a specific transmitting device or component from which the signal was transmitted.

At box 370, the first vehicle receives the signal at a time $t_4$, as determined from the global clock. The signal may be received by a single transceiver or other receiving component provided on the first vehicle, or by multiple transceivers or other receiving components disposed in different locations on the first vehicle. At box 380, the first vehicle computes a relative distance to the second vehicle based on a product of the speed of light c and a difference between the time $t_4$ and the time $t_3$, or $(t_4-t_3)$, and the process ends. The product is a distance between a transceiver or other transmitting device on the second vehicle from which the signal was transmitted and a transceiver or other receiving component on the first vehicle.

As is discussed above, relative distances between two or more objects (e.g., vehicles) may be determined based on times-of-flight of signals transmitted and received by one or more transceivers. The relative distances between transceivers or other transmitting or receiving components may be used to predict an orientation (e.g., a heading) of one or more of the objects.

Referring to FIGS. 4A through 4I, views of aspects of one system 400 for determining relative distances or orientations of vehicles based on times-of-flight of signals in accordance with embodiments of the present disclosure are shown. Except where otherwise noted, reference numerals preceded by the number "4" shown in FIGS. 4A through 4I indicate components or features that are similar to components or features having reference numerals preceded by the number "2" shown in FIG. 2 or by the number "1" shown in FIGS. 1A through 1D.

The system 400 includes a first aerial vehicle 410A and a second aerial vehicle 410B. The first aerial vehicle 410A is a fixed-wing, low-wing general aviation aircraft having a single motor and propeller. The first aerial vehicle 410A includes a first transceiver 416A-1 on a starboard wing, a second transceiver 416A-2 on a port wing, a third transceiver 416A-3 on a tip of the propeller, and a position sensor 425A disposed on a fuselage. The second aerial vehicle 410B is a multi-wing unmanned aerial vehicle having a plurality of motors and rotors. The second aerial vehicle 410B includes a first transceiver 416B-1 disposed at a starboard forward corner, a second transceiver 416B-2 disposed at a port forward corner, a third transceiver 416B-3 disposed at a starboard aft corner, a fourth transceiver 416-4 disposed at a port aft corner, and a position sensor 425B. The position sensor 425A and the position sensor 425B are configured to receive position signals from one or more satellites of a GPS system 490, and one or more of such position signals may include a time in accordance with a global time standard.

Figure 4A:
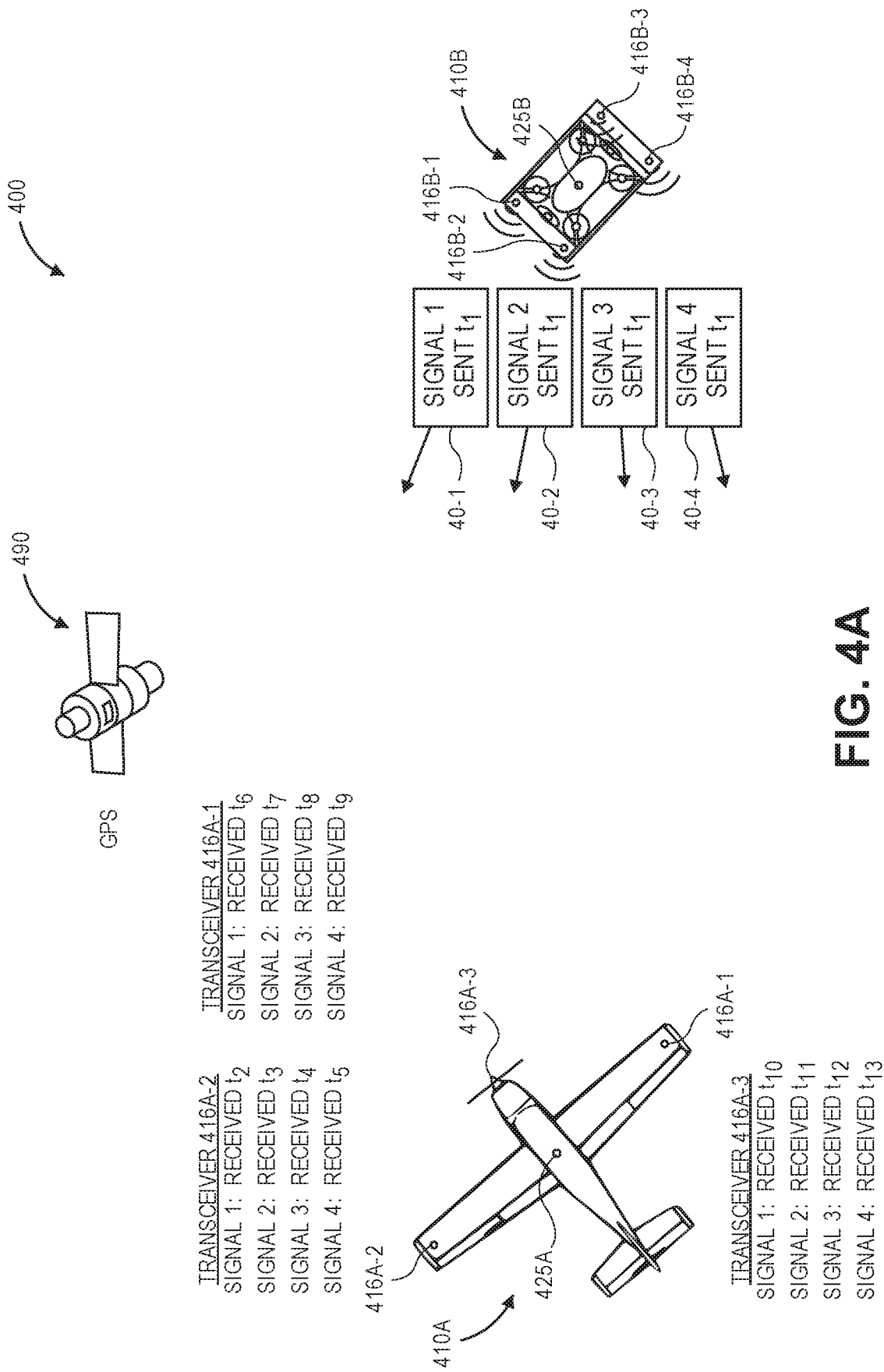
FIGS. 4A through 4I are views of aspects of one system for determining relative distances or orientations of vehicles based on times-of-flight of signals in accordance with embodiments of the present disclosure.

As is shown in FIG. 4A, the second aerial vehicle 410B transmits a first set of four signals 40-1, 40-2, 40-3, 40-4 at a time $t_1$, which may be determined based on one or more position signals received from the GPS system 490. In particular, the first transceiver 416B-1 transmits a first signal 40-1, the second transceiver 416B-2 transmits a second signal 40-2, the third transceiver 416B-3 transmits a third signal 40-3 and the fourth transceiver 416B-4 transmits a fourth signal 40-4.

Each of the four signals 40-1, 40-2, 40-3, 40-4 is received at different times by the first transceiver 416A-1, the second transceiver 416A-2 and the third transceiver 416A-3 of the first aerial vehicle 410A. For example, the first signal 40-1 is received by the second transceiver 416A-2 at a time $t_2$, by the first transceiver 416A-1 at a time $t_6$, and by the third transceiver 416A-3 at a time $t_{10}$. The second signal 40-2 is received by the second transceiver 416A-2 at a time $t_3$, by the first transceiver 416A-1 at a time $t_7$, and by the third transceiver 416A-3 at a time $t_{11}$, while the third signal 40-3 is received by the second transceiver 416A-2 at a time $t_4$, by the first transceiver 416A-1 at a time $t_5$, and by the third transceiver 416A-3 at a time $t_{12}$, and the fourth signal 40-4 is received by the second transceiver 416A-2 at a time $t_5$, by the first transceiver 416A-1 at a time $t_9$, and by the third transceiver 416A-3 at a time $t_{13}$.

Figure 4B:
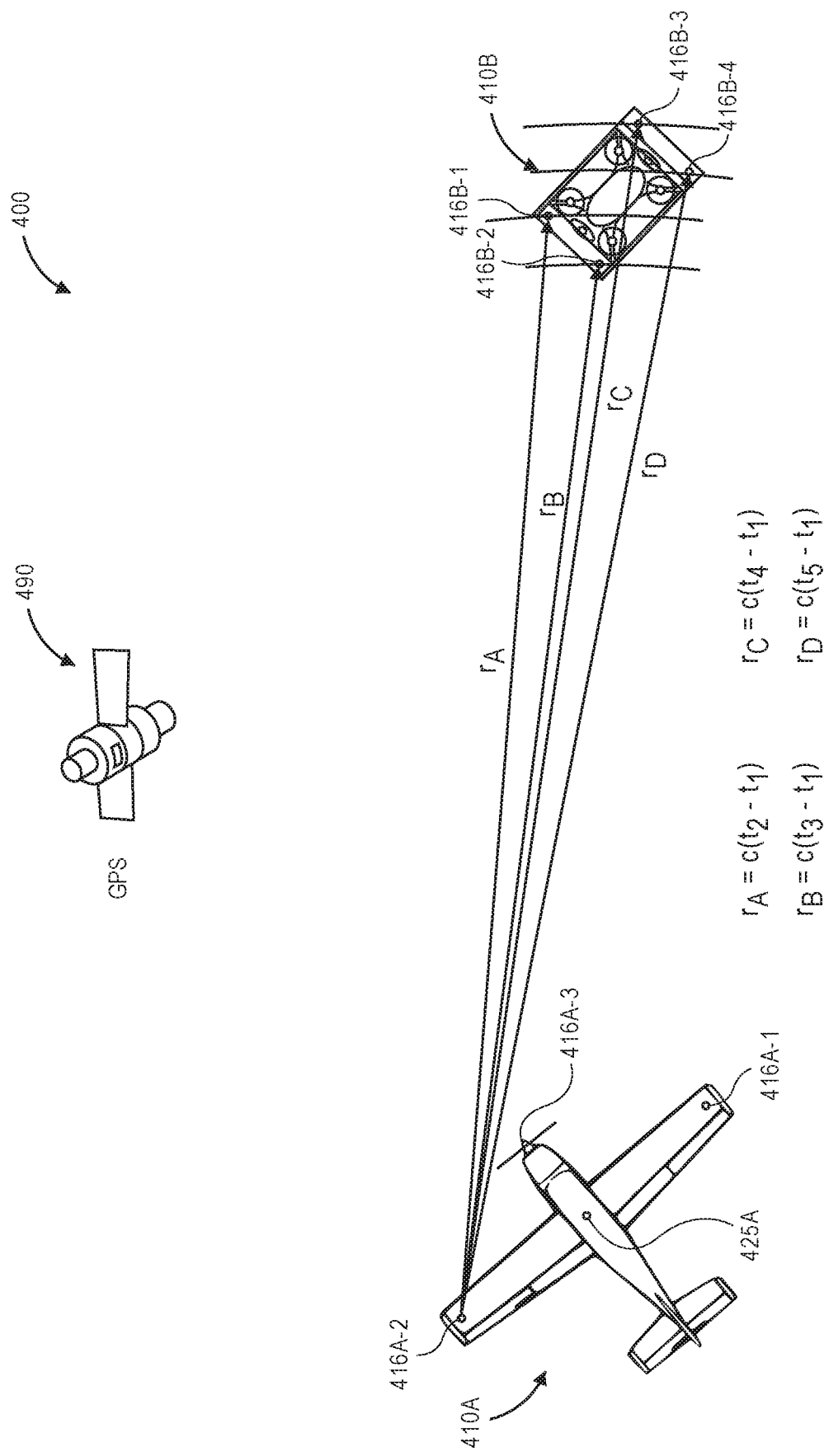

Based on the differences between the times at which the signals 40-1, 40-2, 40-3, 40-4 are transmitted by the first transceiver 416B-1, the second transceiver 416B-2, the third transceiver 416B-3 and the fourth transceiver 416B-4 of the second aerial vehicle 410B, and received by the first transceiver 416A-1 and the second transceiver 416A-2 of the first aerial vehicle 410A, relative distances between the transceivers may be determined. As is shown in FIG. 4B, a relative distance r A between the second transceiver 416A-2 of the first aerial vehicle 410A and the first transceiver 416B-1 of the second aerial vehicle 410B may be determined based on a product of the speed of light c and the difference in time $(t_2-t_1)$. A relative distance 113 between the second transceiver 416A-2 of the first aerial vehicle 410A and the second transceiver 416B-2 of the second aerial vehicle 410B may be determined based on a product of the speed of light c and the difference in time $(t_3-t_1)$. A relative distance $r_C$ between the second transceiver 416A-2 of the first aerial vehicle 410A and the third transceiver 416B-3 of the second aerial vehicle 410B may be determined based on a product of the speed of light c and the difference in time $(t_4-t_1)$. A relative distance $r_D$ between the second transceiver 416A-2 of the first aerial vehicle 410A and the fourth transceiver 416B-4 of the second aerial vehicle 410B may be determined based on a product of the speed of light c and the difference in time $(t_5-t_1)$.

Figure 4C:
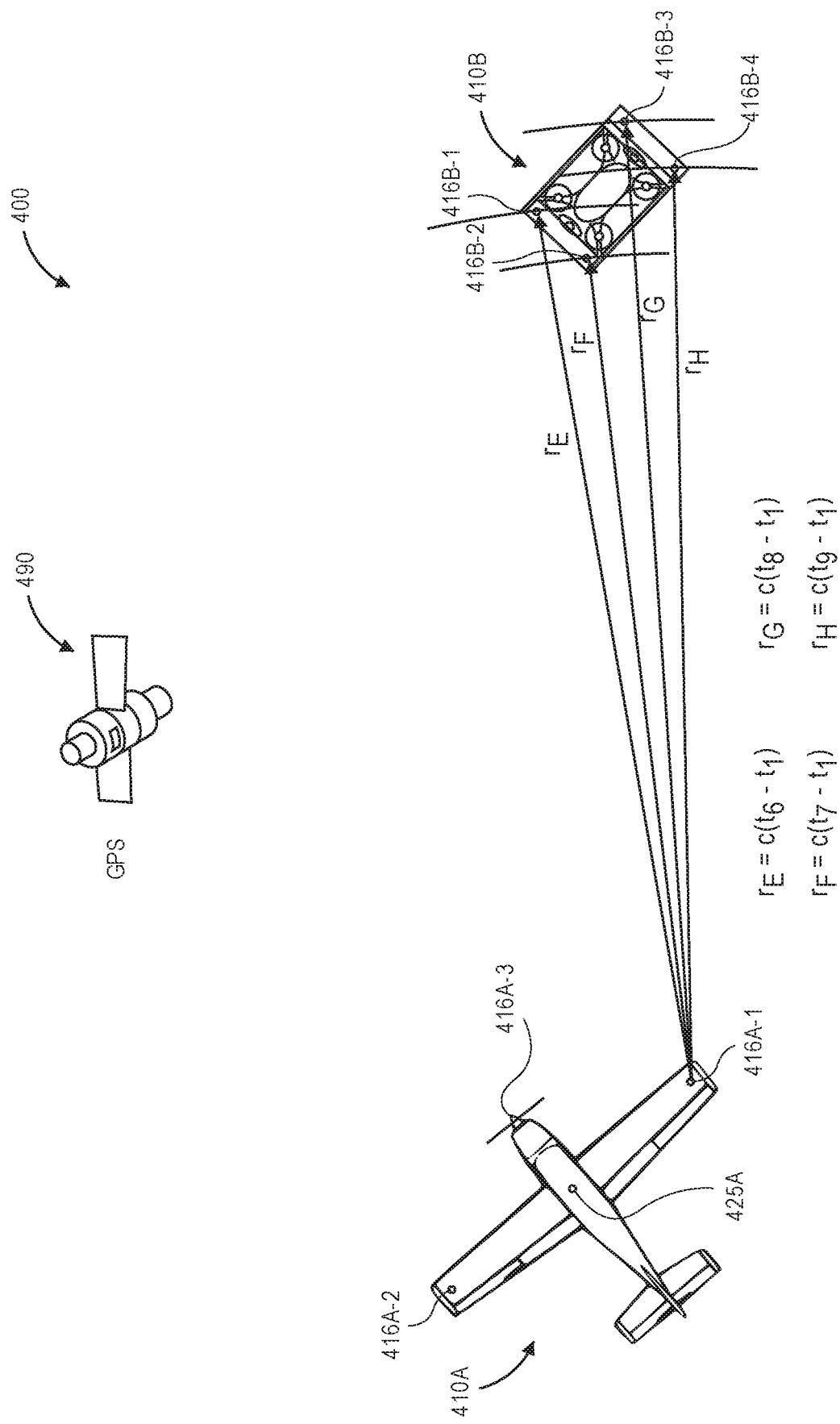

Similarly, as is shown in FIG. 4C, a relative distance $r_E$ between the first transceiver 416A-1 of the first aerial vehicle 410A and the first transceiver 416B-1 of the second aerial vehicle 410B may be determined based on a product of the speed of light c and the difference in time $(t_6-t_1)$. A relative distance $r_F$ between the first transceiver 416A-1 of the first aerial vehicle 410A and the second transceiver 416B-2 of the second aerial vehicle 410B may be determined based on a product of the speed of light c and the difference in time $(t_7-t_1)$. A relative distance $r_G$ between the first transceiver 416A-1 of the first aerial vehicle 410A and the third transceiver 416B-3 of the second aerial vehicle 410B may be determined based on a product of the speed of light c and the difference in time $(t_8-t_1)$. A relative distance $r_H$ between the first transceiver 416A-1 of the first aerial vehicle 410A and the fourth transceiver 416B-4 of the second aerial vehicle 410B may be determined based on a product of the speed of light c and the difference in time $(t_9-t_1)$.

Figure 4D:
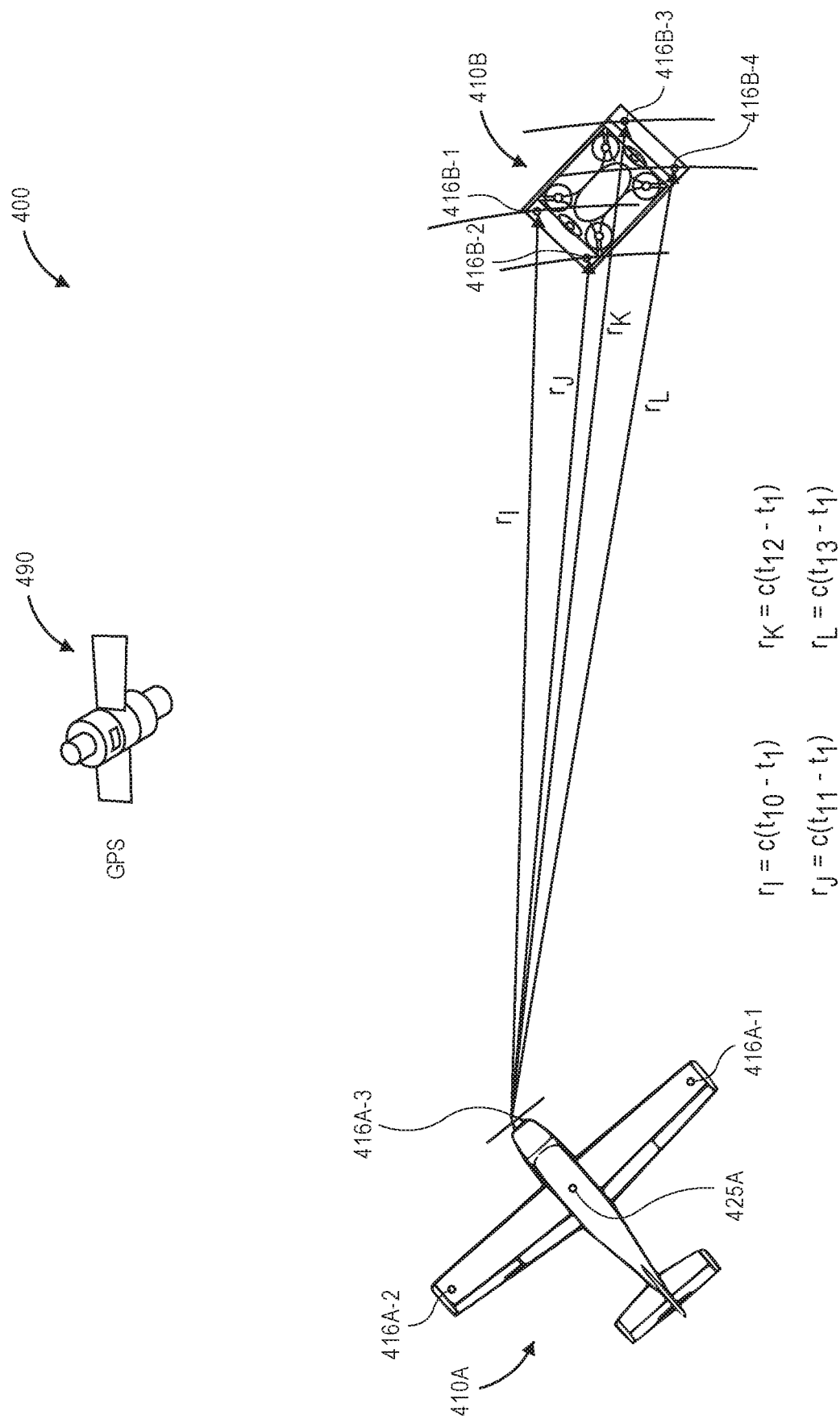

Finally, as is shown in FIG. 4D, a relative distance n between the third transceiver 416A-3 of the first aerial vehicle 410A and the first transceiver 416B-1 of the second aerial vehicle 410B may be determined based on a product of the speed of light c and the difference in time $(t_{10}-t_1)$. A relative distance $r_J$ between the third transceiver 416A-3 of the first aerial vehicle 410A and the second transceiver 416B-2 of the second aerial vehicle 410B may be determined based on a product of the speed of light c and the difference in time $(t_{11}-t_1)$. A relative distance $r_K$ between the third transceiver 416A-3 of the first aerial vehicle 410A and the third transceiver 416B-3 of the second aerial vehicle 410B may be determined based on a product of the speed of light c and the difference in time $(t_{12}-t_1)$. A relative distance $r_L$ between the third transceiver 416A-3 of the first aerial vehicle 410A and the fourth transceiver 416B-4 of the second aerial vehicle 410B may be determined based on a product of the speed of light c and the difference in time $(t_{13}-t_1)$.

Figure 4E:
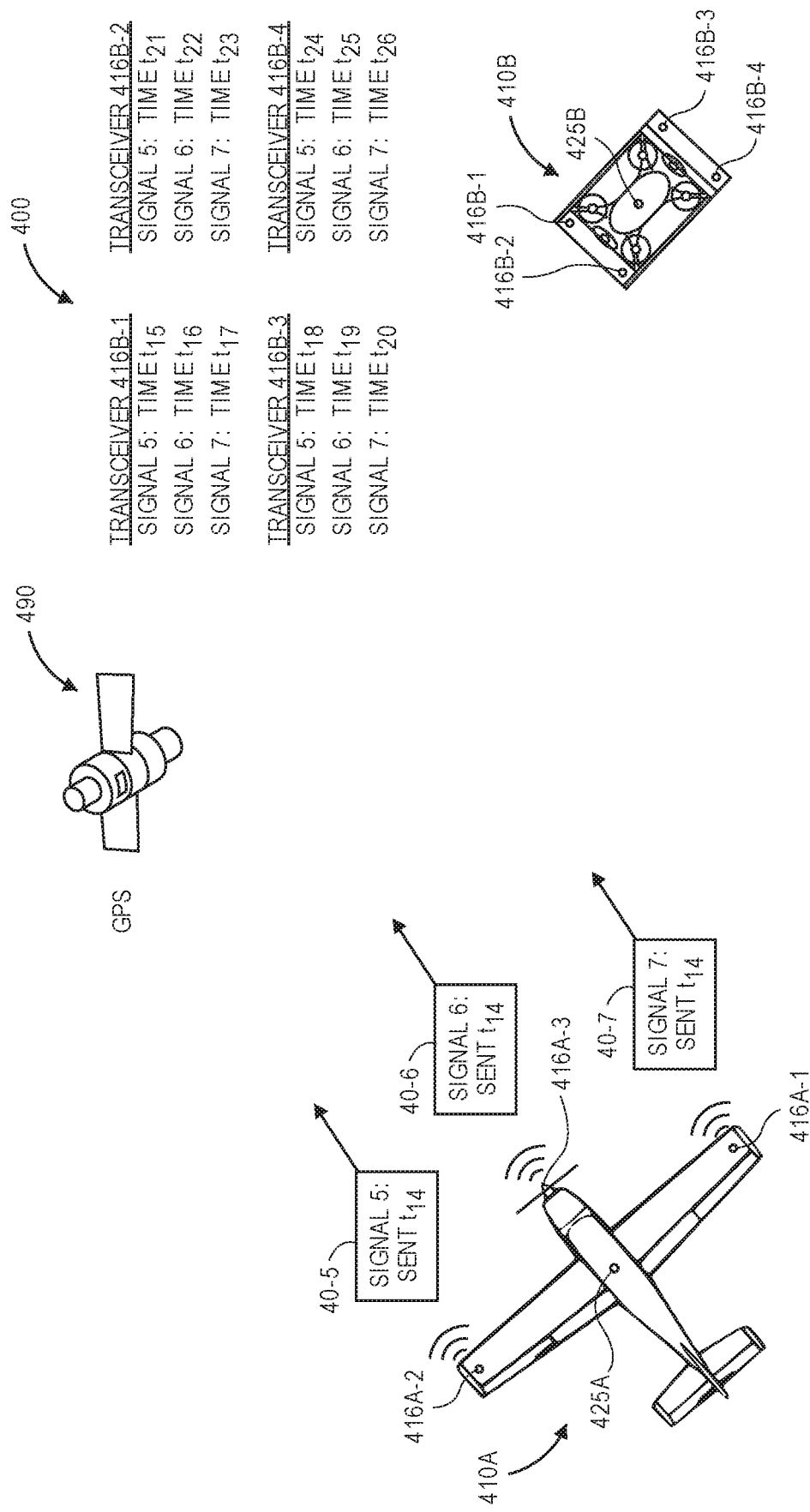

In accordance with the present disclosure, when a vehicle, a station or an object such as the first aerial vehicle 410A receives one or more time-stamped signals from another vehicle, station or object, such as the signals 40-1, 40-2, 40-3, 40-4 transmitted by the second aerial vehicle 410B, such as is shown in FIG. 4A, the vehicle, the station or the object may respond in kind by transmitting one or more time-stamped signals in response. As is shown in FIG. 4E, the first aerial vehicle 410A transmits a second set of three signals 40-5, 40-6, 40-7 at a time $t_{14}$, which may be determined based on one or more position signals received from the GPS system 490. In particular, the second transceiver 416A-2 transmits a fifth signal 40-5, the third transceiver 416A-3 transmits a sixth signal 40-6, and the first transceiver 416A-1 transmits a seventh signal 40-7.

Each of the three signals 40-5, 40-6, 40-7 is received at different times by the first transceiver 416B-1, the second transceiver 416B-2, the third transceiver 416B-3 and the fourth transceiver 416B-4 of the second aerial vehicle 410B. For example, the fifth signal 40-5 is received by the first transceiver 416B-1 at a time $t_{15}$, by the third transceiver 416B-3 at a time $t_{18}$, by the second transceiver 416B-2 at a time $t_{21}$ and by the fourth transceiver 416B-4 at a time $t_{24}$. The sixth signal 40-6 is received by the first transceiver 416B-1 at a time $t_{16}$, by the third transceiver 416B-3 at a time $t_{19}$, by the second transceiver 416B-2 at a time $t_{22}$ and by the fourth transceiver 416B-4 at a time $t_{25}$. The seventh signal 40-7 is received by the first transceiver 416B-1 at a time $t_{17}$, by the third transceiver 416B-3 at a time $t_{20}$, by the second transceiver 416B-2 at a time $t_{23}$ and by the fourth transceiver 416B-4 at a time $t_{26}$.

Figure 4F:
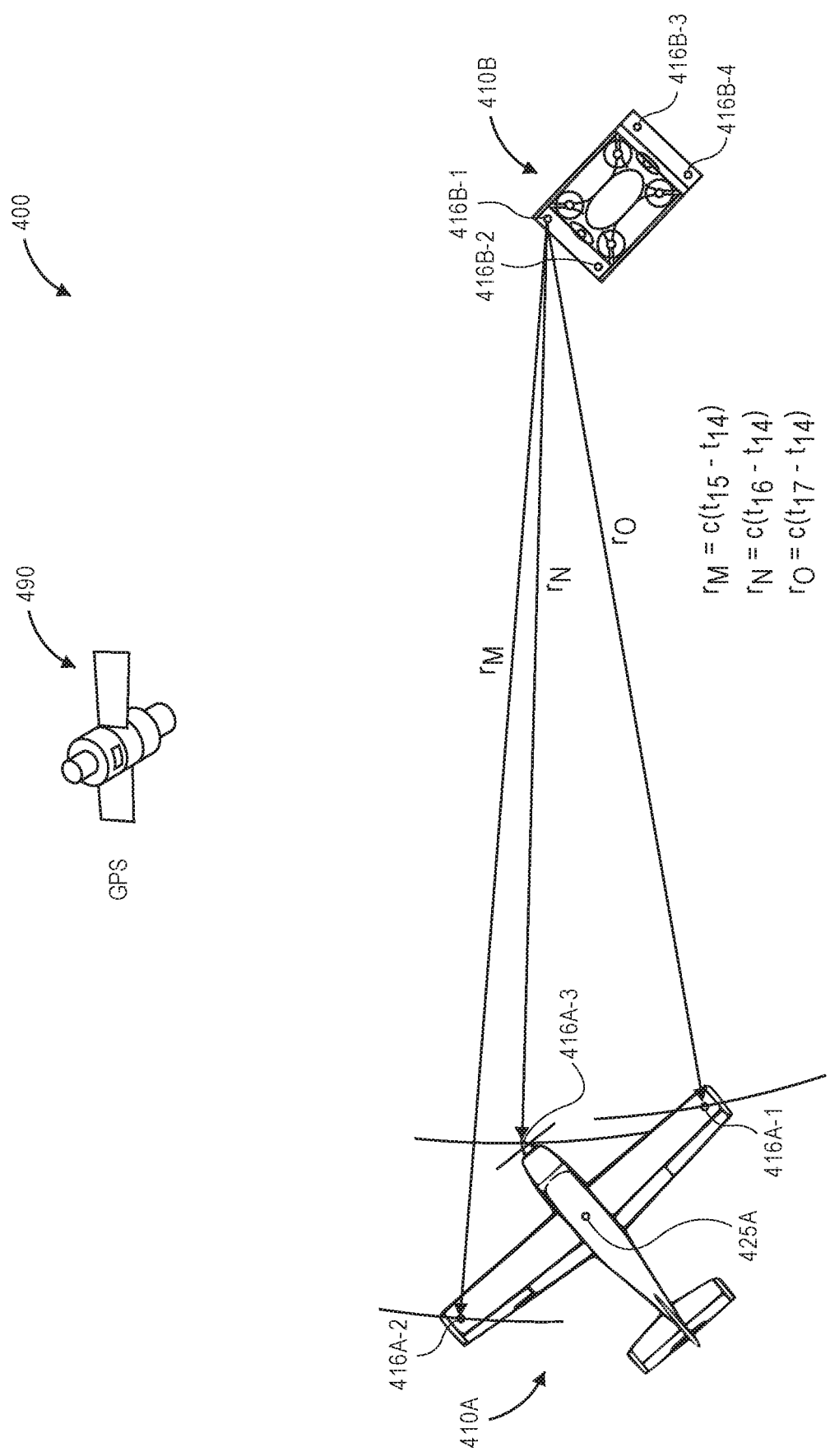

Based on the differences between the times at which the signals 40-5, 40-6, 40-7 are transmitted by the first transceiver 416A-1, the second transceiver 416A-2 and the third transceiver 416A-3 of the first aerial vehicle 410A, and received by the first transceiver 416B-1, the second transceiver 416B-2, the third transceiver 416B-3 and the fourth transceiver 416B-4 of the second aerial vehicle 410B, relative distances between the transceivers may be determined. As is shown in FIG. 4F, a relative distance $r_M$ between the first transceiver 416B-1 of the second aerial vehicle 410B and the second transceiver 416A-2 of the first aerial vehicle 410A may be determined based on a product of the speed of light c and the difference in time $(t_{15}-t_{14})$. A relative distance $r_N$ between the first transceiver 416B-1 of the second aerial vehicle 410B and the third transceiver 416A-3 of the first aerial vehicle 410A may be determined based on a product of the speed of light c and the difference in time $(t_{16}-t_{14})$. A relative distance $r_O$ between the first transceiver 416B-1 of the second aerial vehicle 410B and the first transceiver 416A-1 of the first aerial vehicle 410A may be determined based on a product of the speed of light c and the difference in time ($t_{17}-t_{14}$).

Figure 4G:
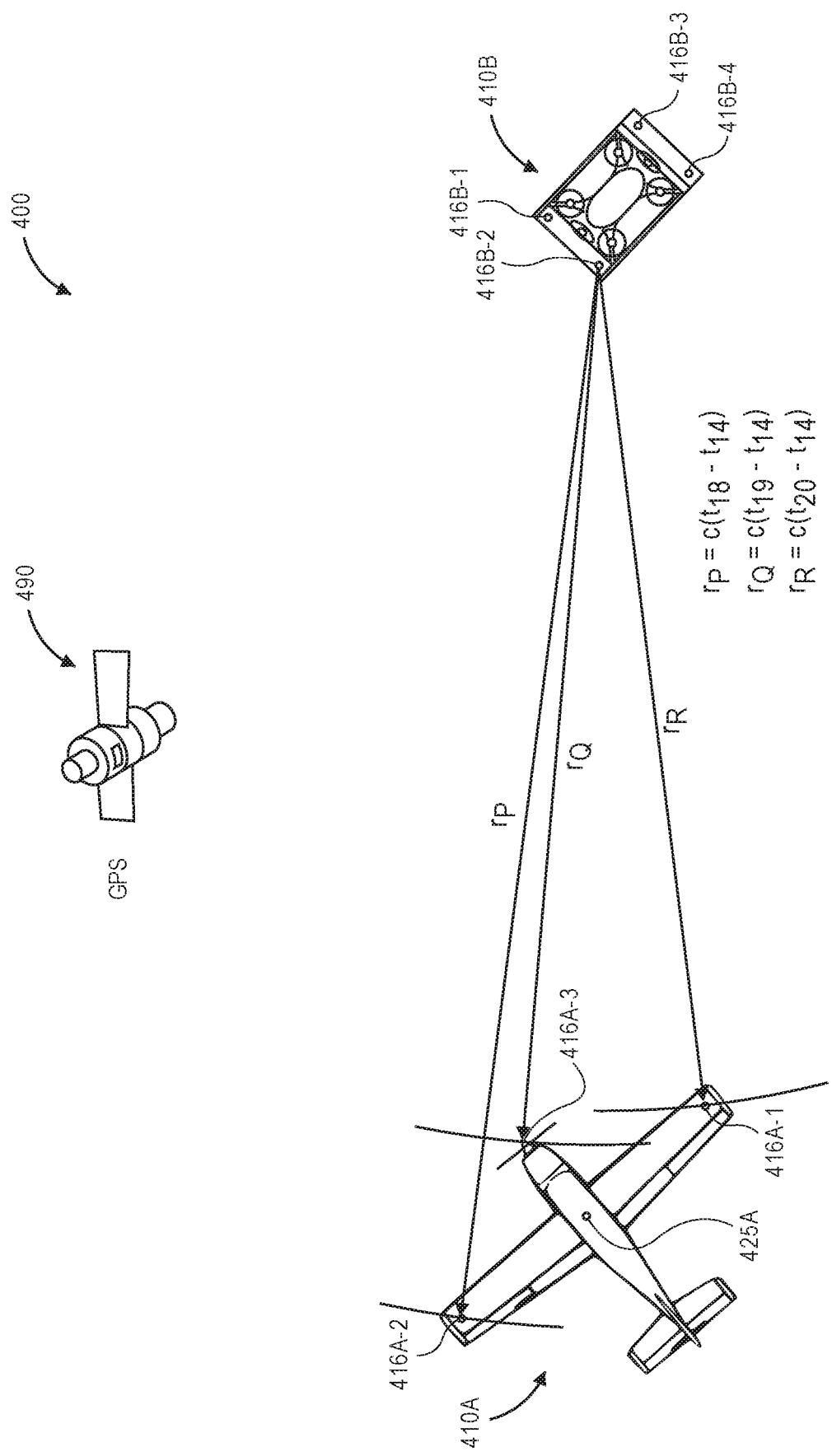

Similarly, as is shown in FIG. 4G, a relative distance $r_P$ between the second transceiver 416B-2 of the second aerial vehicle 410B and the second transceiver 416A-2 of the first aerial vehicle 410A may be determined based on a product of the speed of light c and the difference in time ($t_{18}-t_{14}$). A relative distance $r_Q$ between the second transceiver 416B-2 of the second aerial vehicle 410B and the third transceiver 416A-3 of the first aerial vehicle 410A may be determined based on a product of the speed of light c and the difference in time ($t_{19}-t_{14}$). A relative distance $r_R$ between the second transceiver 416B-2 of the second aerial vehicle 410B and the first transceiver 416A-1 of the first aerial vehicle 410A may be determined based on a product of the speed of light c and the difference in time ($t_{20}-t_{14}$).

Figure 4H:
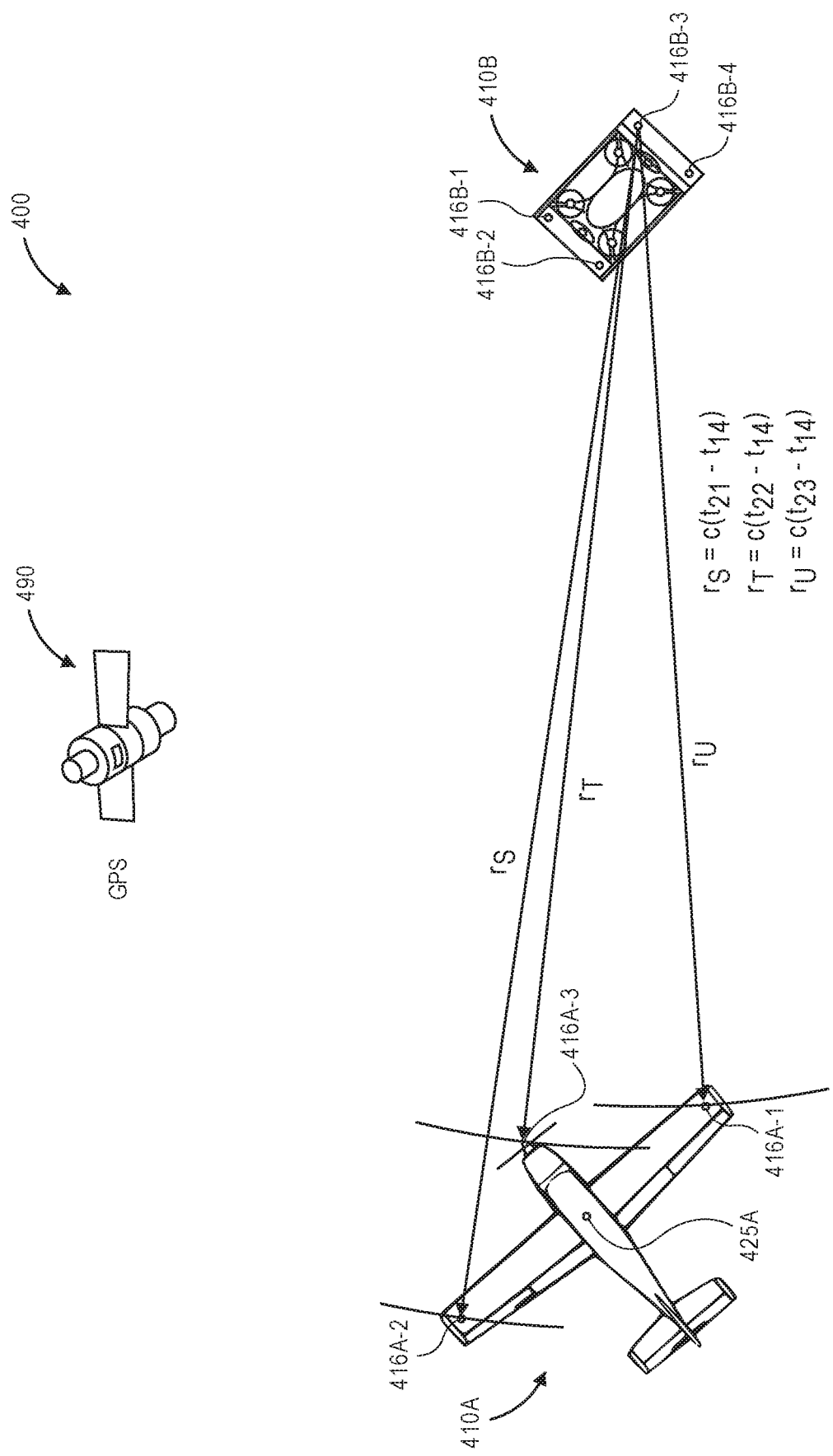

As is also shown in FIG. 4H, a relative distance $r_S$ between the third transceiver 416B-3 of the second aerial vehicle 410B and the second transceiver 416A-2 of the first aerial vehicle 410A may be determined based on a product of the speed of light c and the difference in time ($t_{21}-t_{14}$). A relative distance $r_T$ between the third transceiver 416B-3 of the second aerial vehicle 410B and the third transceiver 416A-3 of the first aerial vehicle 410A may be determined based on a product of the speed of light c and the difference in time ($t_{22}-t_{14}$). A relative distance $r_U$ between the third transceiver 416B-3 of the second aerial vehicle 410B and the first transceiver 416A-2 of the first aerial vehicle 410A may be determined based on a product of the speed of light c and the difference in time ($t_{23}-t_{14}$).

Figure 4I:
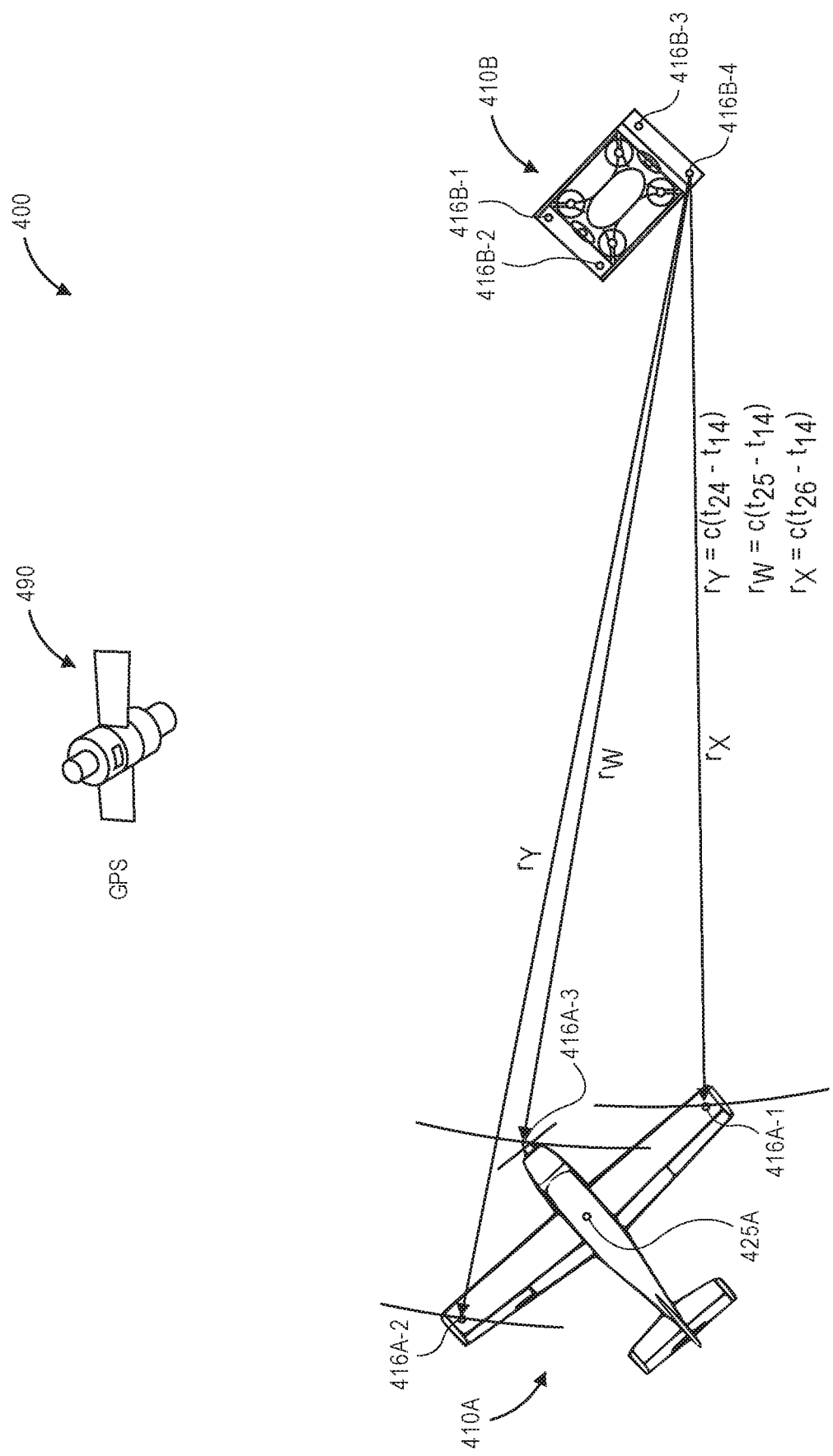

Finally, as is shown in FIG. 4I, a relative distance $r_V$ between the fourth transceiver 416B-4 of the second aerial vehicle 410B and the second transceiver 416A-2 of the first aerial vehicle 410A may be determined based on a product of the speed of light c and the difference in time ($t_{24}-t_{14}$). A relative distance $r_W$ between the fourth transceiver 416B-4 of the second aerial vehicle 410B and the third transceiver 416A-3 of the first aerial vehicle 410A may be determined based on a product of the speed of light c and the difference in time ($t_{25}-t_{14}$). A relative distance $r_X$ between the fourth transceiver 416B-4 of the second aerial vehicle 410B and the first transceiver 416A-2 of the first aerial vehicle 410A may be determined based on a product of the speed of light c and the difference in time ($t_{26}-t_{14}$).

The various relative distances calculated based on the transmission and receipt of the signals 40-1, 40-2, 40-3, 40-4, 40-5, 40-6, 40-7 shown in FIGS. 4A and 4E may be used by the first aerial vehicle 410A and the second aerial vehicle 410B to predict or determine one or more attributes of each other. For example, the relative distances between the first transceiver 416A-1 of the first aerial vehicle 410A, and the respective transceivers 416B-1, 416B-2, 416B-3, 416B-4 of the second aerial vehicle 410B, and the relative distances between the second transceiver 416A-2 of the first aerial vehicle 410A, and the respective transceivers 416B-1, 416B-2, 416B-3, 416B-4 of the second aerial vehicle 410B, may be used to predict or determine an alignment of the second aerial vehicle 410B. For example, a position of the first transceiver 416B-1 of the second aerial vehicle 410B may be predicted or determined based on an intersection of two or more of the relative distance $r_A$, the relative distance $r_E$ and the relative distance $r_I$. A position of the second transceiver 416B-2 of the second aerial vehicle 410B may be predicted or determined based on an intersection of two or more of the relative distance $r_B$, the relative distance $r_F$ and the relative distance n, while a position of the third transceiver 416B-3 of the second aerial vehicle 410B may be predicted or determined based on an intersection of two or more of the relative distance $r_C$, the relative distance $r_G$ and the relative distance $r_K$, and a position of the fourth transceiver 416B-4 of the second aerial vehicle 410B may be predicted or determined based on an intersection of two or more of the relative distance $r_D$, the relative distance $r_H$ and the relative distance $r_L$. Similarly, a position of the second transceiver 416A-2 of the first aerial vehicle 410A may be predicted based on an intersection of two or more of the relative distances $r_M$, $r_P$, $r_S$, $r_V$. A position of the third transceiver 416A-3 of the first aerial vehicle 410A may be predicted based on an intersection of two or more of the relative distances $r_N$, $r_Q$, $r_T$, $r_W$. A position of the first transceiver 416A-1 of the first aerial vehicle 410A may be predicted based on an intersection of two or more of the relative distances $r_O$, $r_R$, $r_U$, $r_X$.

Moreover, in some embodiments, by transmitting and receiving signals at various times, each of the first aerial vehicle 410A and the second aerial vehicle 410B may track their relative distances to one another over time. For example, after the second aerial vehicle 410B has transmitted the signals 40-1, 40-2, 40-3, 40-4 at time $t_1$ as is shown in FIG. 4A, the second aerial vehicle 410B may transmit another set of signals at a later time. Subsequently, as is shown in FIGS. 4B through 4D, the first aerial vehicle 410A may determine relative distances to each of the transceivers that transmitted the signals at time $t_1$, and may again determine relative distances to each of the same transceivers that transmitted the other set of signals at the later time. By tracking the relative distances to the respective transceivers over time, the first aerial vehicle 410A may determine a course and/or a velocity of the second aerial vehicle 410B.

Additionally, in some embodiments, where a position and/or a velocity of the first aerial vehicle 410A is known, the first aerial vehicle 410A may determine a position and/or a velocity of the second aerial vehicle 410B based upon the receipt of the first set of signals 40-1, 40-2, 40-3, 40-4 transmitted by each of the first transceiver 416B-1, the second transceiver 416B-2, the third transceiver 416B-3 and the fourth transceiver 416B-4 of the second aerial vehicle 410B. Where a position and/or a velocity of the second aerial vehicle 410B is known, the second aerial vehicle 410B may determine a position and/or a velocity of the first aerial vehicle 410A based upon the receipt of the second set of signals 40-5, 40-6, 40-7 transmitted by each of the second transceiver 416A-2, the third transceiver 416A-3 or the first transceiver 416A-1 of the first aerial vehicle 410A. In some embodiments, one or more of the first set of signals 40-1, 40-2, 40-3, 40-4 may include a position and/or a velocity of the second aerial vehicle 410B. In some embodiments, one or more of the second set of signals 40-5, 40-6, 40-7 may include a position and/or a velocity of the first aerial vehicle 410A.

Figure 5:
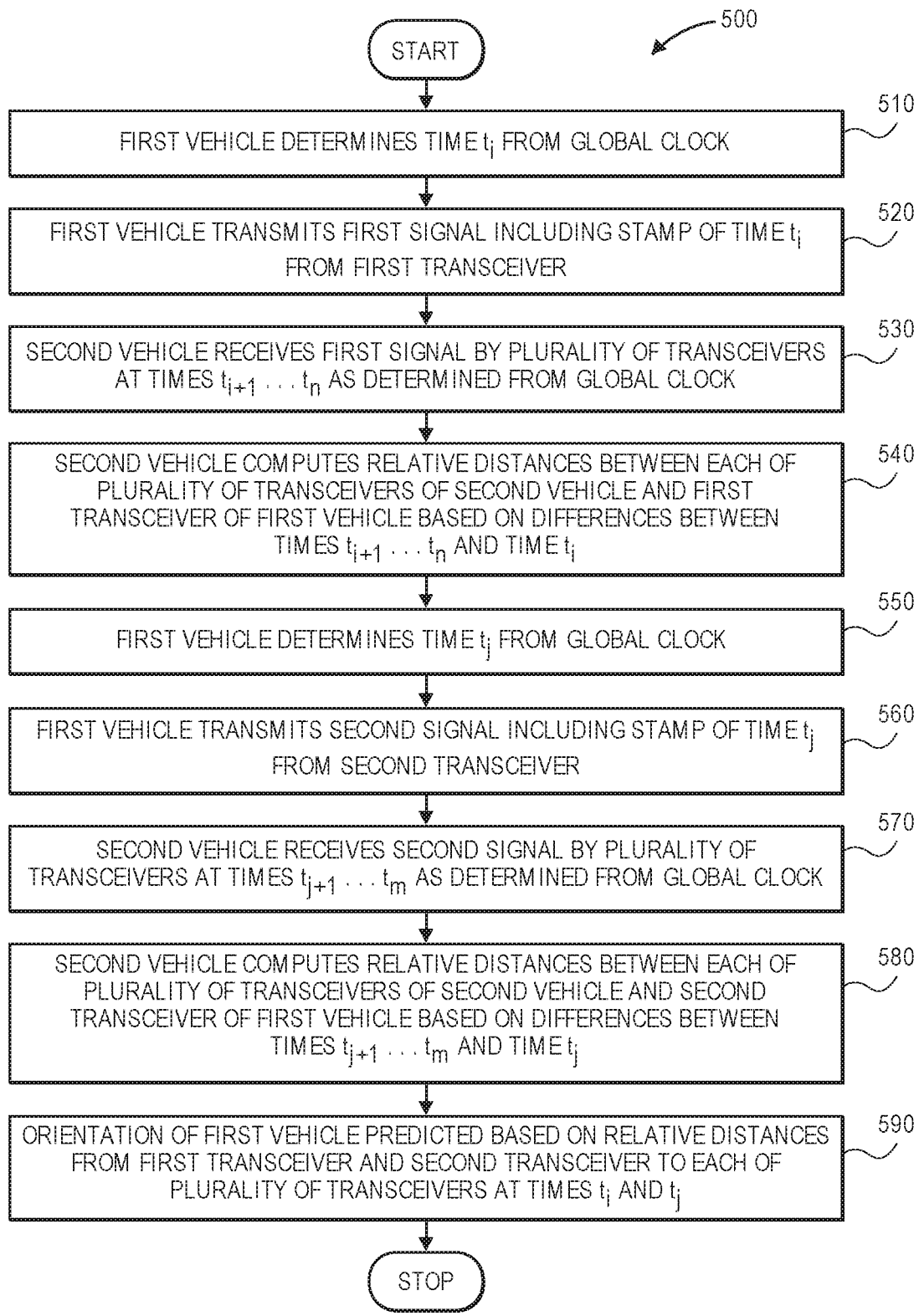
FIG. 5 is a flow chart of one process for determining relative distances or orientations of vehicles based on times-of-flight of signals in accordance with embodiments of the present disclosure.

As is discussed above, some embodiments of the present disclosure may be directed to predicting or determining orientations of a first object (e.g., a first vehicle) based on a signal received from the first object by multiple transceivers of a second object (e.g., a second vehicle). Referring to FIG. 5, a flow chart 500 of one process for determining relative distances or orientations of vehicles based on times-of-flight of signals in accordance with embodiments of the present disclosure is shown. At box 510, a first vehicle (e.g., an aerial vehicle) determines a time $t_i$ from a global clock, e.g., based on one or more position signals received from one or more GPS satellites, according to a global time standard. At box 520, the first vehicle transmits a first signal including a stamp of the time $t_i$ from a first transceiver. For example, the first transceiver may be provided in any location on the first vehicle, such as on one or more control surfaces, fuselages, landing gear components, wheels, axles, cabins, airframes or the like. The first signal may include not only a time stamp of the time $t_i$ but also one or more identifiers of the first vehicle or the first transceiver, or any other data or metadata. Additionally, the first signal may be transmitted independently at the time $t_i$, or as one of a plurality of signals (e.g., a burst of such signals) at or around the time $t_i$, in accordance with the present disclosure.

At box 530, a second vehicle receives the first signal by a plurality of transceivers at times $t_{i+1}$ through $t_n$, as determined by the global clock. For example, referring again to FIG. 4A, the first signal 40-1 transmitted by the first transceiver 416B-1 on the forward starboard corner of the second aerial vehicle 410B at the time $t_1$ is received by the first transceiver 416A-1 on the starboard wing of the first aerial vehicle 410A at the time $t_6$, by the second transceiver 416A-2 on the port wing of the first aerial vehicle 410A at the time $t_2$, and by the third transceiver 416A-3 on the tip of the propeller of the first aerial vehicle 410A at the time $t_{10}$. At box 540, the second vehicle computes relative distances between each of the plurality of transceivers of the second vehicle that received the first signal, and the first transceiver of the first aerial vehicle that transmitted the first signal, based on differences between the time $t_1$ and each of the times $t_{i+1}$ through $t_n$. For example, referring again to FIGS. 4B and 4C, the relative distance $r_A$ between the second transceiver 416A-2 of the first aerial vehicle 410A and the first transceiver 416B-1 of the second aerial vehicle 410B, the relative distance $r_E$ between the first transceiver 416A-1 of the first aerial vehicle 410A and the first transceiver 416B-1 of the second aerial vehicle 410B, and the relative distance $r_I$ between the third transceiver 416A-3 of the first aerial vehicle 410A and the first transceiver 416B-1 of the second aerial vehicle 410B may be calculated as products of the speed of light c and differences in time $(t_2-t_1)$, $(t_6-t_1)$ and $(t_{10}-t_1)$, respectively.

At box 550, the first vehicle determines a time $t_j$ from the global clock, and at box 560, the first vehicle transmits a second signal including a stamp of the time $t_j$ from a second transceiver, which may be provided in any location on the first vehicle, other than a location of the first transceiver. The time $t_j$ may be equal to the time $t_i$, or different from the time $t_i$, in accordance with the present disclosure. The second signal may include the time stamp of the time $t_j$ and also any other data or metadata, and may be transmitted independently or as one of a plurality of signals.

At box 570, the second vehicle receives the second signal by a plurality of transceivers at times $t_{j+1}$ through $t_m$, as determined by the global clock. At box 580, the second vehicle computes relative distances between each of the plurality of transceivers of the second vehicle that received the second signal, and the second transceiver of the first aerial vehicle that transmitted the second signal, based on differences between the time $t_j$ and each of the times $t_{j+1}$ through $t_m$.

At box 590, an orientation of the first vehicle is predicted based on relative distances from the first transceiver of the first vehicle to the plurality of transceivers of the second vehicle, as computed at box 540, and relative distances from the second transceiver of the first vehicle to the plurality of transceivers of the second vehicle, as computed at box 580, and the process ends. For example, a configuration of the first transceiver and the second transceiver of the first vehicle, with respect to one another, may be determined based on such relative distances and used to predict an orientation and/or a heading of the first vehicle.

As is discussed above, the signals from which relative distances and/or orientations are determined in accordance with the present disclosure may include time stamps and any other relevant data or metadata that may be captured and interpreted by a transceiver associated with any vehicle, station or object within a signal range of a transceiver that transmitted the signals. Referring to FIGS. 6A through 6E, views of signals 60A, 60B, 60C, 60D, 60E in accordance with embodiments of the present disclosure are shown. Except where otherwise noted, reference numerals preceded by the number "6" shown in FIGS. 6A through 6E indicate components or features that are similar to components or features having reference numerals preceded by the number "4" shown in FIGS. 4A through 4I, by the number "2" shown in FIG. 2 or by the number "1" shown in FIGS. 1A through 1D.

Figure 6A:
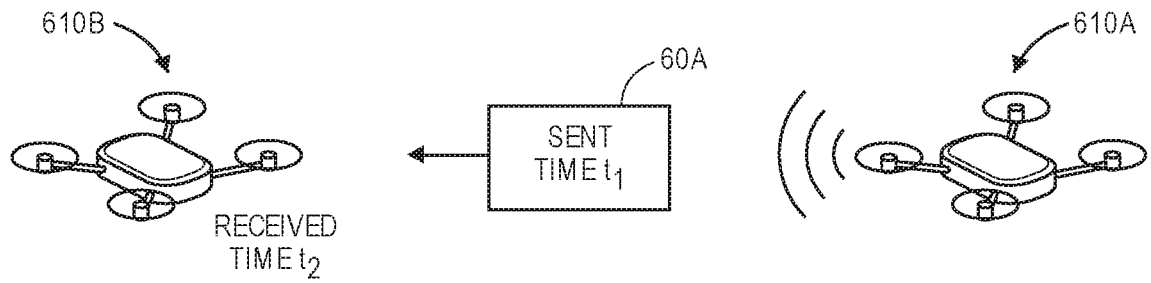
FIGS. 6A through 6E are views of signals in accordance with embodiments of the present disclosure.

As is shown in FIG. 6A, a first aerial vehicle 610A transmits the signal 60A at time and a second aerial vehicle 610B receives the signal 60A at a time $t_2$. The signal 60A consists of a time stamp identifying the time $t_1$. Thus, the signal 60A may be used to calculate a relative distance from the second aerial vehicle 610B to the first aerial vehicle 610A based on a product of the speed of light and a difference between the time $t_2$ and the time $t_1$. Any type or form of other information or data regarding the first aerial vehicle 610A may be included in the signal 60A.

Figure 6B:
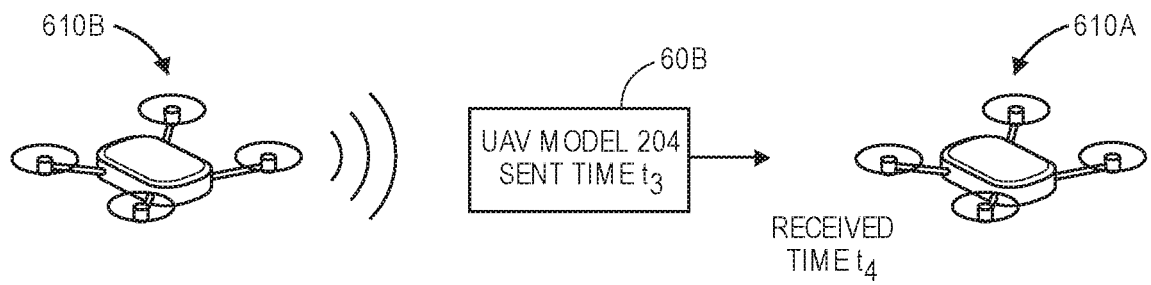

As is shown in FIG. 6B, the second aerial vehicle 610B transmits the signal 60B at a time $t_3$, and the first aerial vehicle 610A receives the signal 60B at a time $t_4$. The signal 60B includes a time stamp identifying the time $t_3$, and also a model number or other identifier of the second aerial vehicle 610B. Thus, the signal 60B may be used to calculate a relative distance from the first aerial vehicle 610A to the second aerial vehicle 610B based on a product of the speed of light and a difference between the time $t_4$ and the time $t_3$. Additionally, the model number or other identifier of the second aerial vehicle 610B may be utilized, along with the relative distance, to predict an orientation of the second aerial vehicle 610B, based on any information or data that may be known regarding the second aerial vehicle 610B or aerial vehicles having the model number or other identifier, e.g., positions of transceivers on one or more external surfaces of the second aerial vehicle 610B, or dimensions, operational capacities, attributes or characteristics of the second aerial vehicle 610B. Any type or form of other information or data regarding the first aerial vehicle 610B may be included in the signal 60B.

Figure 6C:
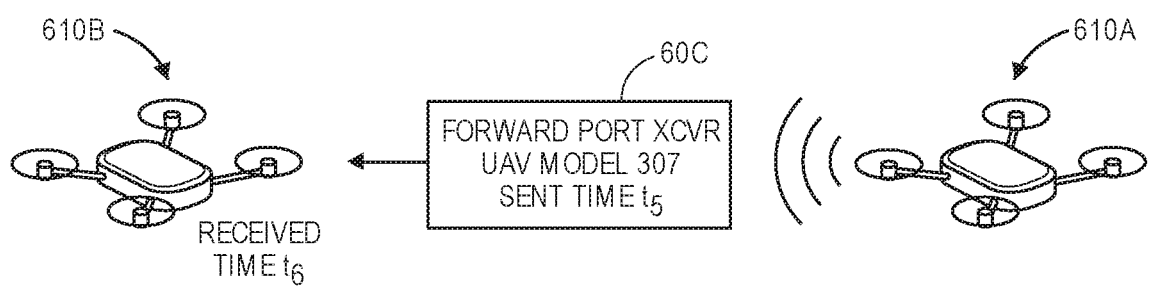

As is shown in FIG. 6C, the first aerial vehicle 610A transmits the signal 60C at a time $t_5$, and the second aerial vehicle 610B receives the signal 60C at a time $t_6$. The signal 60C includes a time stamp identifying the time $t_5$, a model number or other identifier of the first aerial vehicle 610A, and an identifier of a specific transceiver on the first aerial vehicle 610A from which the signal 60C was transmitted. Thus, the signal 60C may be used to calculate a relative distance to the transceiver identified in the signal 60C, e.g., based on a product of the speed of light and a difference between the time $t_6$ and the time $t_5$. Additionally, the model number or identifier of the first aerial vehicle 610A and the identifier of the transceiver that transmitted signal 60C may be used to determine an orientation of the first aerial vehicle 610A with respect to a position of the transceiver, e.g., where one or more dimensions, operational capacities, attributes or characteristics of the first aerial vehicle 610A are known.

Any type or form of other information or data regarding the first aerial vehicle 610A may be included in the signal 60C.

Figure 6D:
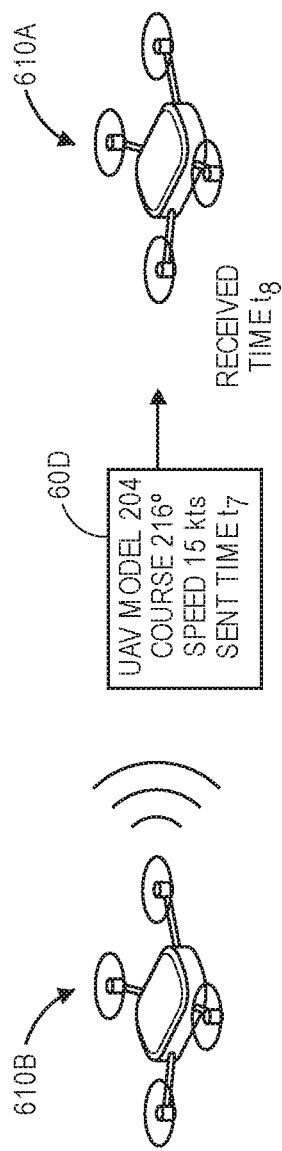

As is shown in FIG. 6D, the second aerial vehicle 610B transmits the signal 60D at a time $t_7$, and the first aerial vehicle 610A receives the signal 60D at a time $t_5$. The signal 60D includes a time stamp identifying the time $t_7$ and a model number or other identifier of the second aerial vehicle 610B, as well as a course and a speed of the second aerial vehicle 610B. Thus, the signal 60D may be used by the first aerial vehicle 610A to not only calculate a relative distance to the second aerial vehicle 610B but also to determine the course and the speed of the second aerial vehicle 610B. Any type or form of other information or data regarding the second aerial vehicle 610B may be included in the signal 60D.

Figure 6E:
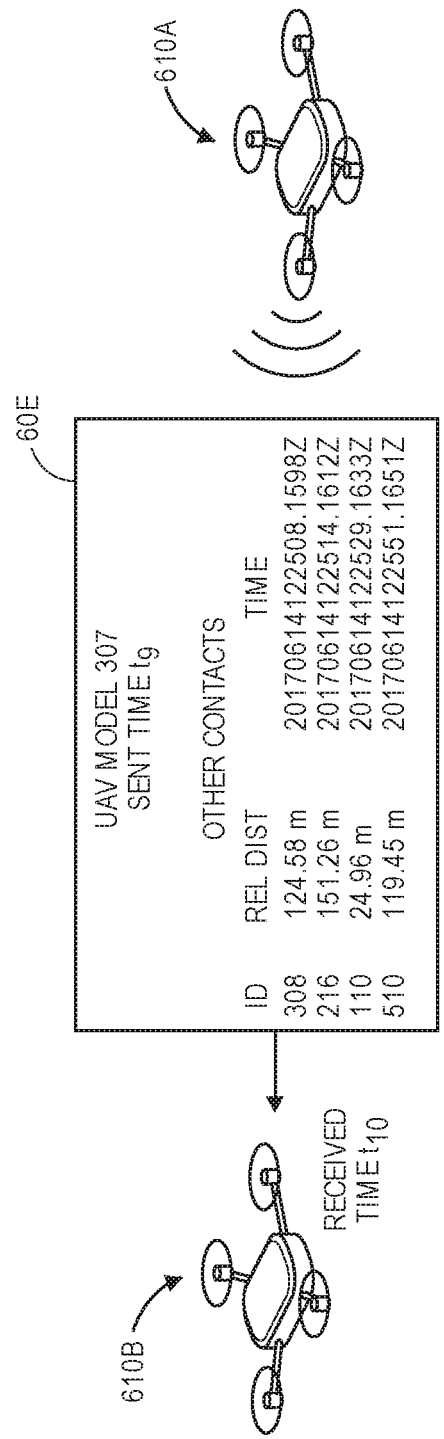

As is shown in FIG. 6E, the first aerial vehicle 610A transmits the signal 60E at a time $t_9$, and the second aerial vehicle 610B receives the signal 60E at a time $t_{10}$. The signal 60E includes a time stamp identifying the time $t_9$ and a model number or other identifier of the first aerial vehicle 610A. Additionally, the signal 60E further includes identifiers of a plurality of other aerial vehicles, relative distances from the first aerial vehicle 610A to each of the other aerial vehicles, and times at which such relative distances were determined. Thus, based on the signal 60E, the second aerial vehicle 610B or any other vehicle, station or object that receives the signal 60E may determine not only a relative distance to the first aerial vehicle 610A but also relative distances from the first aerial vehicle 610A to each of a plurality of vehicles, stations or other objects. Based on such relative distances, the second aerial vehicle 610B, or any other vehicle, station or object, may calculate relative distances to each of the other vehicles, stations or objects. Any type or form of other information or data regarding the first aerial vehicle 610A may be included in the signal 60E, including but not limited to an identifier or an association of one or more of the relative distances and/or times with one or more of the other aerial vehicles or other stations or objects described therein.

In accordance with some embodiments of the present disclosure, an object (e.g., a vehicle) may virtually map or describe itself by transmitting a plurality of signals including time stamps and identifiers or descriptors of transceivers from which such signals were transmitted. A transceiver or other receiving component that receives such signals may utilize the time stamps to determine relative positions to such transceivers, and the identifiers or descriptors of such transceivers may be used to virtually construct the object in three-dimensional space.

Figure 7:
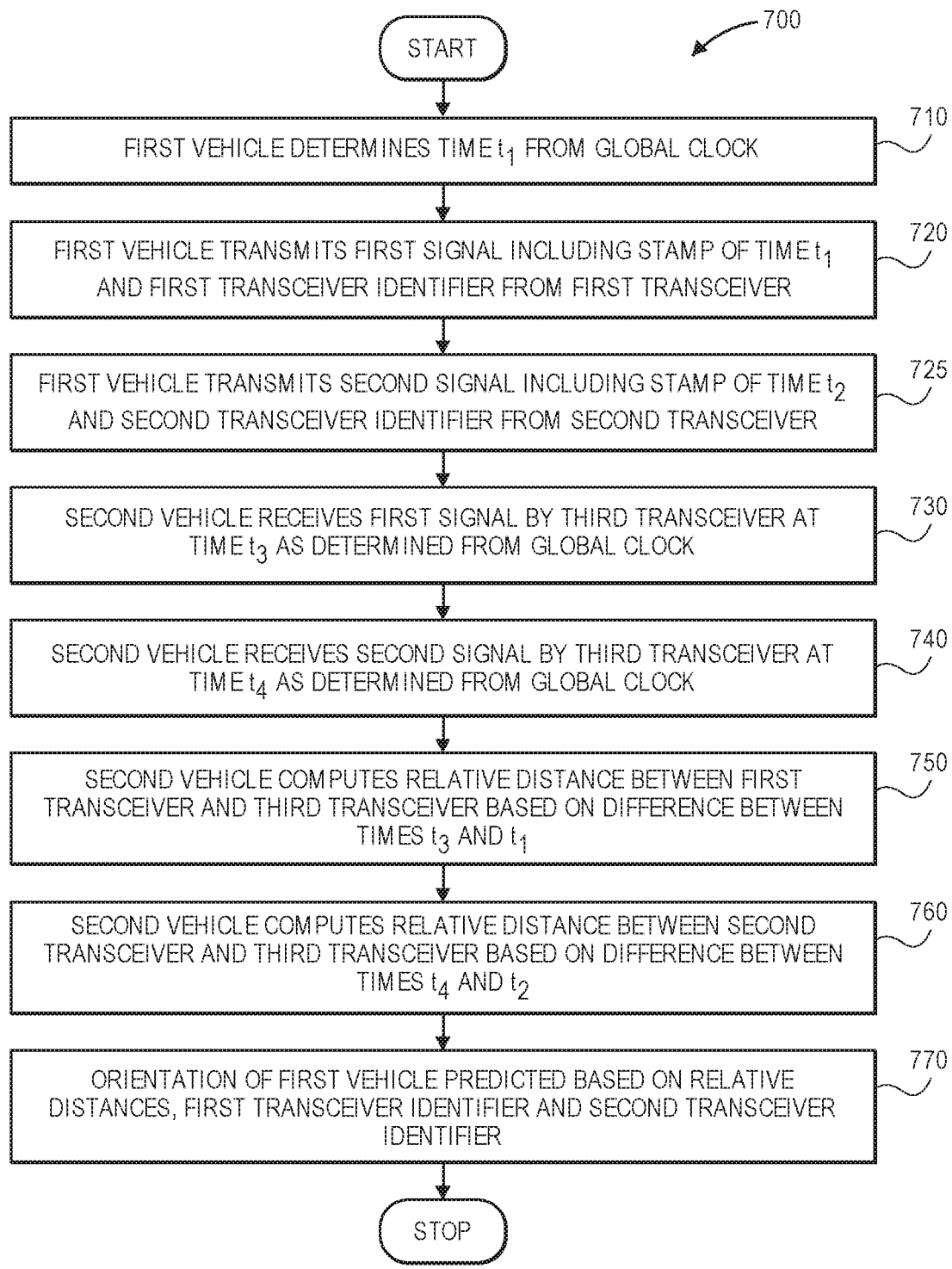
FIG. 7 is a flow chart of one process for determining relative distances or orientations of vehicles based on times-of-flight of signals in accordance with embodiments of the present disclosure.

Referring to FIG. 7, a flow chart 700 of one process for determining relative distances or orientations of vehicles based on times-of-flight of signals in accordance with embodiments of the present disclosure is shown. At box 710, a first vehicle determines a time $t_1$ from a global clock, e.g., according to a global time standard, and at box 720, a first transceiver of the first vehicle transmits a first signal including a time stamp of the time $t_1$ along with an identifier of the first transceiver. At box 725, a second transceiver of the first vehicle transmits a second signal including a time stamp of the time $t_2$ along with an identifier of the second transceiver. For example, the first transceiver and/or the second transceiver may transmit a signal similar to the signal 60C of FIG. 6, which includes a time stamp, a model number or other identifier of the first aerial vehicle 610A, and an identifier of a specific transceiver on the first aerial vehicle 610A.

At box 730, a second vehicle receives the first signal by a third transceiver at a time $t_3$, as determined by the global clock, and at box 740, the second vehicle receives the second signal by a third transceiver at a time $t_4$, as determined by the global clock. At box 750, the second vehicle computes a relative distance between the first transceiver and the third transceiver based on the difference in time $(t_3-t_1)$. At box 760, the second vehicle computes a relative distance between the second transceiver and the third transceiver based on the difference in time $(t_4-t_2)$. Alternatively, the second signal may be received by a fourth transceiver of the second vehicle, and need not be received by the same transceiver that received the first signal.

At box 770, an orientation of the first vehicle is predicted based on the relative distances, the first transceiver identifier and the second transceiver identifier, and the process ends. For example, where relative distances to the respective transceivers and relationships between the respective transceivers are known, the first vehicle may be virtually constructed with respect to the second vehicle, and the orientation of the first vehicle (e.g., a heading of the first vehicle) may be predicted accordingly.

Figure 8A:
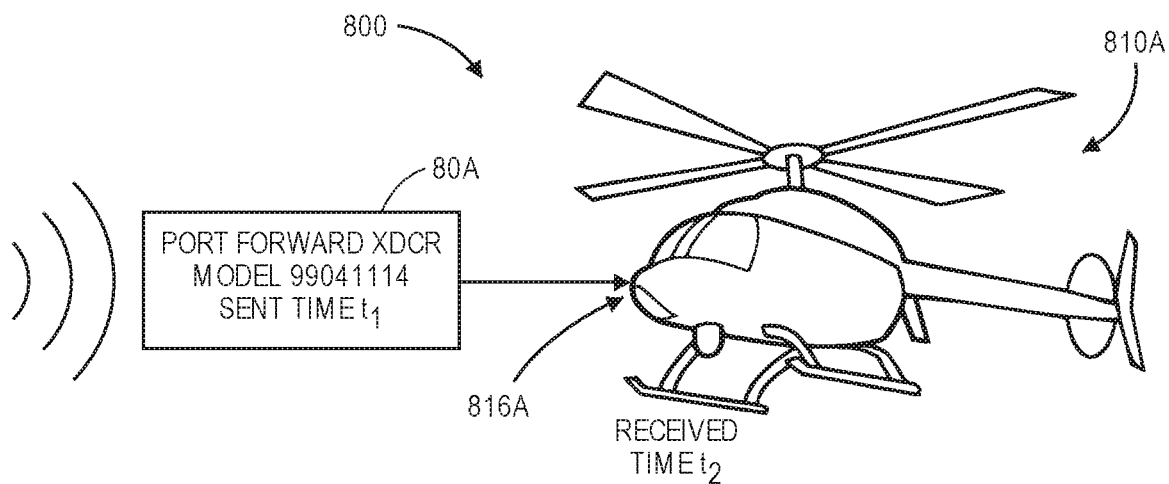
FIGS. 8A through 8C are views of aspects of one system for determining relative distances or orientations of vehicles based on times-of-flight of signals in accordance with embodiments of the present disclosure.
Figure 8B:
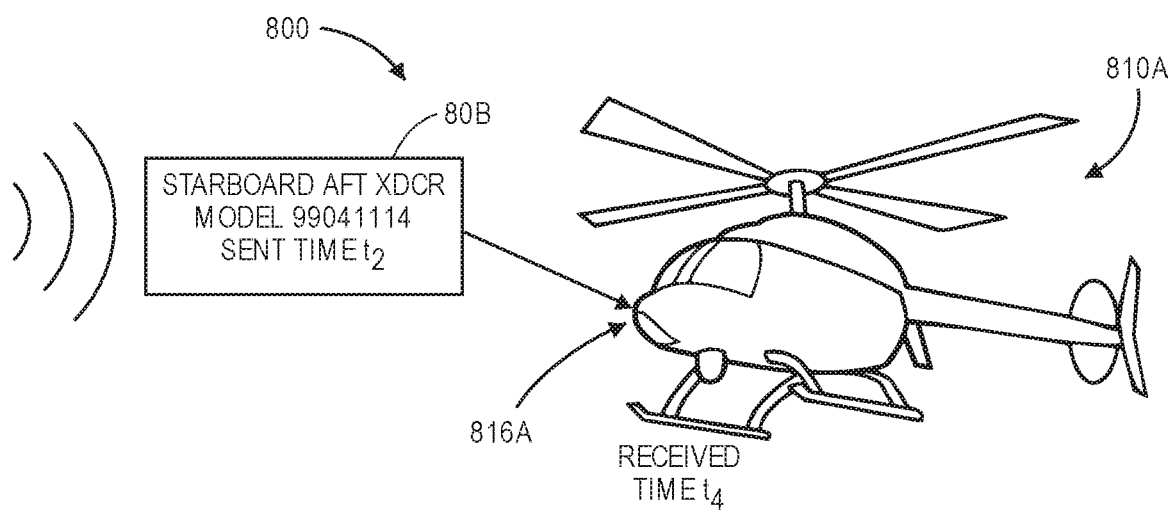
Figure 8C:
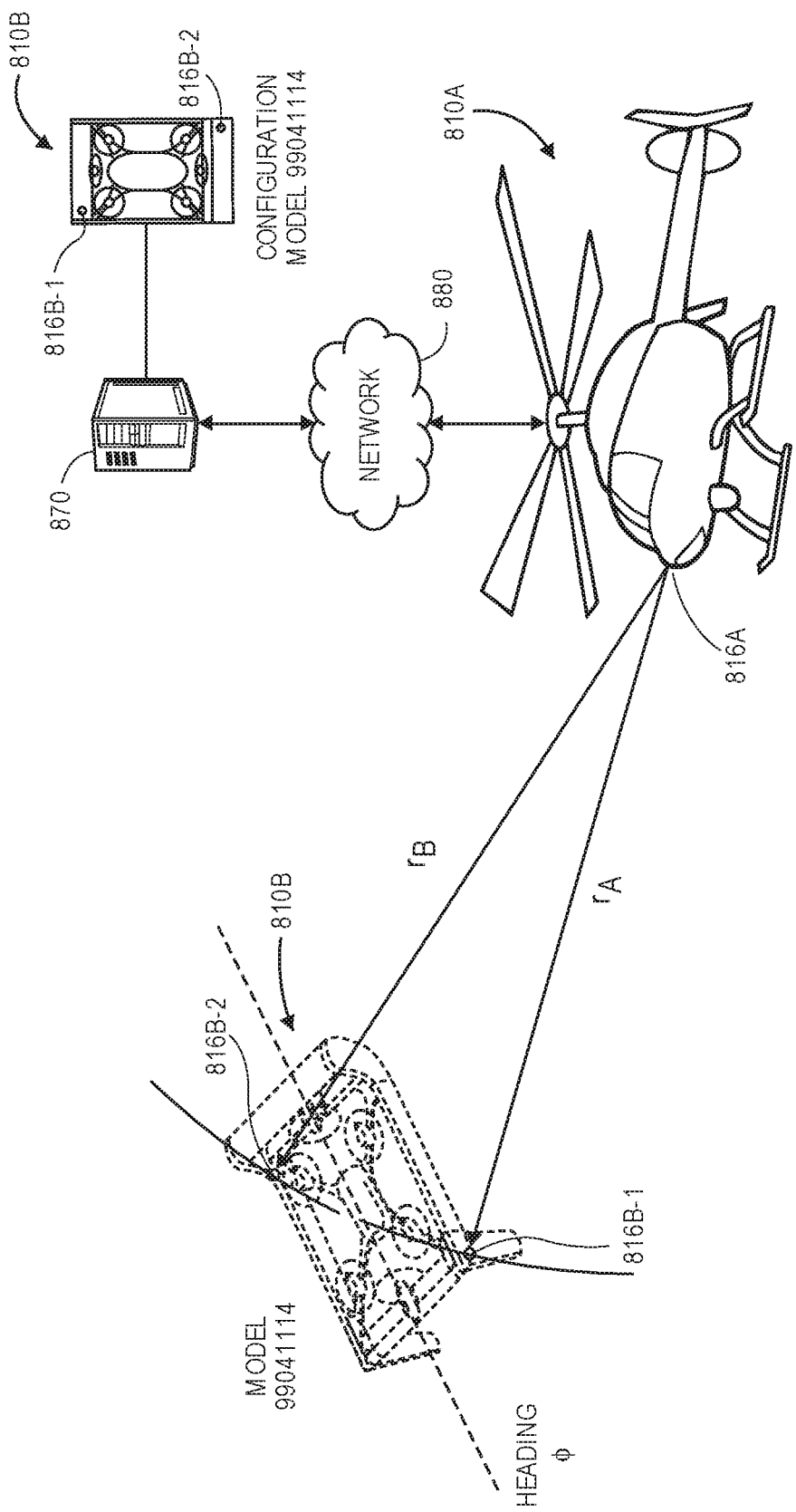

Referring to FIGS. 8A through 8C, views of aspects of one system 800 for determining relative distances or orientations of vehicles based on times-of-flight of signals in accordance with embodiments of the present disclosure are shown. Except where otherwise noted, reference numerals preceded by the number "8" shown in FIGS. 8A through 8C indicate components or features that are similar to components or features having reference numerals preceded by the number "6" shown in FIGS. 6A through 6E, by the number "4" shown in FIGS. 4A through 4I, by the number "2" shown in FIG. 2 or by the number "1" shown in FIGS. 1A through 1D.

The system 800 includes an aerial vehicle 810A having a first transceiver 816A. As is shown in FIG. 8A, the aerial vehicle 810A receives a first signal 80A at time $t_2$. The first signal 80A includes a time stamp indicating that the first signal 80A was transmitted at a time $t_1$ by a port forward transceiver of a specific model of aerial vehicle (viz., Model No. 99041114). As is shown in FIG. 8B, the aerial vehicle 810A receives a second signal 80B at a time $t_4$. The second signal 80B includes a time stamp indicating that the second signal 80B was transmitted at a time $t_2$ by a starboard aft transceiver of the same model of aerial vehicle (viz., Model No. 99041114) that transmitted the first signal 80A.

In accordance with some embodiments of the present disclosure, an aerial vehicle that transmitted the first signal 80A and the second signal 80B may be virtually mapped based on relative distances between the first transceiver 816A and the transceivers identified in the first signal 80A and the second signal 80B, along with information or data regarding the specific model of the aerial vehicle, which may be used to identify specifications, details, or other features of the aerial vehicle. Relative positions of the transceivers and other aspects of the aerial vehicle may be determined accordingly with respect to the first transceiver 816A of the aerial vehicle 810A.

As is shown in FIG. 8C, an aerial vehicle 810B may be virtually constructed based on a relative distance $r_A$ between the first transceiver 816A and the port forward transceiver 816B-2, and a relative distance $r_B$ between the first transceiver 816A and the starboard aft transceiver 816B-1. The relative distance $r_A$ may be calculated based on a product of the speed of light c and a difference in time $(t_2-t_1)$, while the relative distance $r_B$ may be calculated based on a product of the speed of light c and a difference in time $(t_4-t_3)$. Using structural information that may be known regarding the aerial vehicle 810B, e.g., based on the model number included in the first signal 80A and the second signal 80B, a heading φ and layout of the aerial vehicle 810B may be determined accordingly. For example, upon receiving the first signal 80A and the second signal 80B, identifying the model number, and determining the relative distances $r_A$, $r_B$, the aerial vehicle 810A may access information regarding a configuration of aerial vehicles 810B bearing the model number, e.g., from one or more data stores 870 over a network 880, and may utilize the information or data in determining the heading φ and layout of the aerial vehicle 810B based on the relative distances $r_A$, $r_B$. Alternatively, the aerial vehicle 810A may include one or more onboard computer devices and/or data stores that are programmed with information regarding configurations of a plurality of aerial vehicles, from which the configuration of the aerial vehicle 810B may be selected based on the relative distances $r_A$, $r_B$.

Moreover, the aerial vehicle 810A may also track the position and/or velocity of the aerial vehicle 810B over time based on signals that are received from the port forward transceiver 816B-2 and/or the starboard aft transceiver 816B-1. For example, where the configuration of the aerial vehicle 810B is known, and two or more signals are received from the port forward transceiver 816B-2 and/or the starboard aft transceiver 816B-1 over time, the relative distances to the port forward transceiver 816B-2 and/or the starboard aft transceiver 816B-1 at such times may be calculated, and the aerial vehicle 810A may track positions and/or velocities of the aerial vehicle 810B based on the relative distances and the known configuration of the aerial vehicle 810B.

Figure 9:
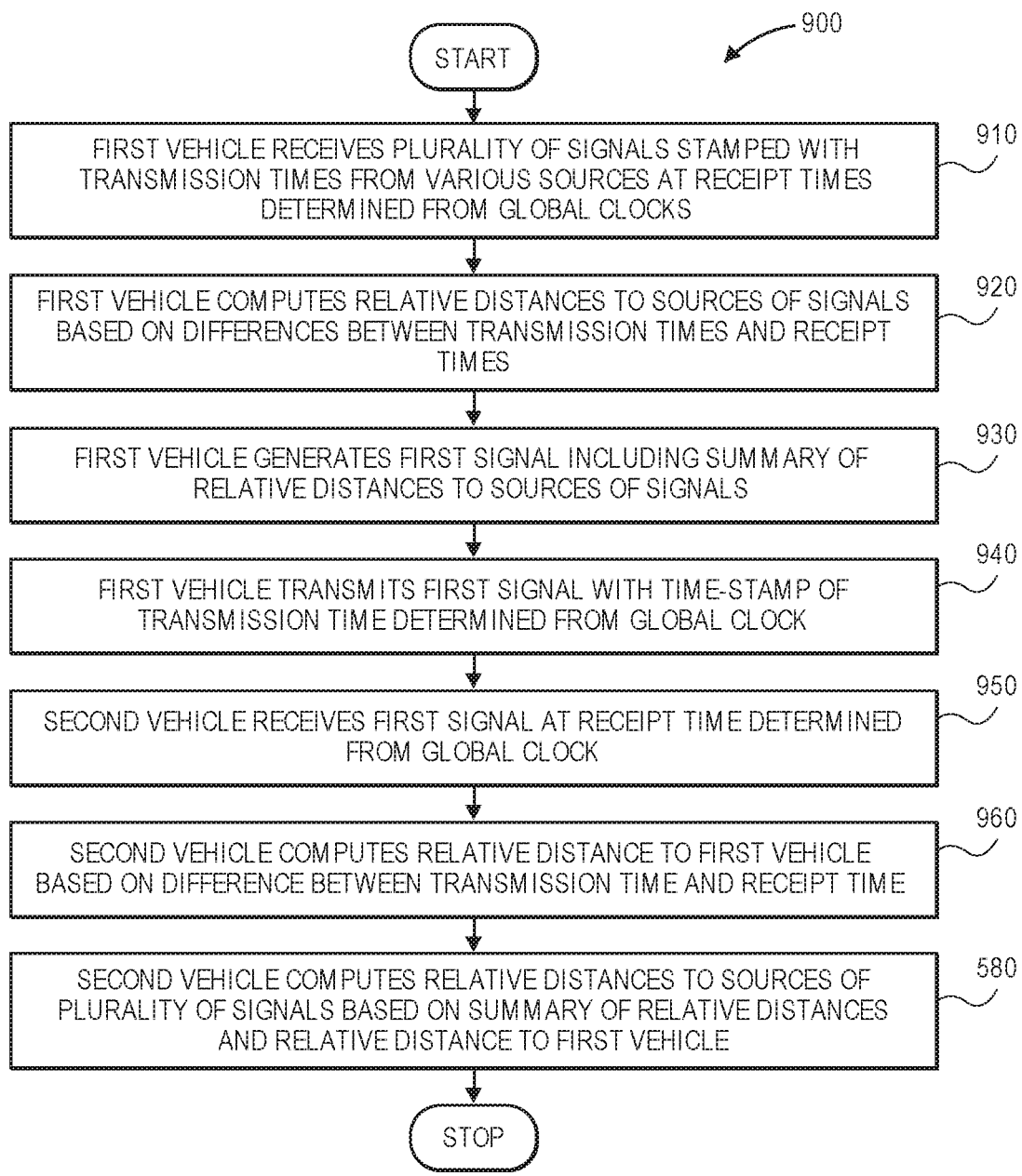
FIG. 9 is a flow chart of one process for determining relative distances based on times-of-flight of signals in accordance with embodiments of the present disclosure.

As is discussed above, some embodiments of the present disclosure may be directed to determining relative distances between two objects (e.g., vehicles or stations) based on signals transmitted and received by such objects. Referring to FIG. 9, a flow chart 900 of one process for determining relative distances between vehicles based on times-of-flight of signals in accordance with embodiments of the present disclosure is shown. At box 910, a first vehicle receives a plurality of signals stamped with transmission times from various sources at receipt times determined from global clocks. For example, the signals may be electromagnetic signals (e.g., radiofrequency signals), optical signals, acoustic signals, or signals transmitted according to any other standard or protocol. Each of the signals may be transmitted according to the same standard or protocol, or according to different standards or protocols, and may but need not include reciprocal information or data, or similar information or data. The sources may be one or more other vehicles, fixed or mobile stations having transmitting and/or receiving components, or objects of any type or form. The receipt times may be determined by any number of global clocks, e.g., atomic clocks provided in one or more orbiting satellites, or according to any global time standard.

At box 920, the first vehicle computes relative distances to sources of the signals based on differences between the transmission times and the receipt times. Where the signals are electromagnetic and/or optical in nature, products of the speed of light and the differences between the transmission times and the receipt times may be used to determine the relative distances. Where the signals are acoustic in nature, products of the speed of sound and the differences between the transmission times and the receipt times may be used to determine the relative distances.

At box 930, the first vehicle generates a first signal that includes a summary of each of the relative distances to each of the sources of signals determined at box 920. For example, the first signal may include identifiers of the sources of the signals received at box 910, the relative distances between the first vehicle and each of the sources, and times at which each of the plurality of signals from which the relative distances were calculated at box 920 was received, such as is shown in FIG. 6E. Alternatively, the first signal may include any other information or data, including but not limited to an identifier of the first vehicle or a transceiver aboard the first vehicle from which the first signal is to be transmitted, a course and/or a speed of the first vehicle, or any other relevant information or data.

At box 940, the first vehicle transmits the first signal along with a time stamp of a transmission time, as determined from a global clock. At box 950, a second vehicle receives the first signal at a receipt time determined from a global clock, and at box 960, the second vehicle computes a relative distance to the first vehicle based on a difference between the transmission time of the first signal and a receipt time of the first signal.

At box 970, the second vehicle computes relative distances to each of the sources of the plurality of signals based on the summary of the relative distances included in the first signal, and the relative distance to the first vehicle computed at box 960, and the process ends. Thus, by determining a time at which the first signal was received using a global clock, and upon interpreting the contents of the first signal, the second vehicle is able to determine not only a relative distance to the first vehicle, but also relative distances from the first vehicle to any number of other vehicles, stations or objects, and to compute relative distances from itself to such vehicles, stations or objects.

Referring to FIGS. 10A through 10D, views of aspects of one system 1000 for determining relative distances or orientations of vehicles based on times-of-flight of signals in accordance with embodiments of the present disclosure are shown. Except where otherwise noted, reference numerals preceded by the number "10" shown in FIGS. 10A through 10D indicate components or features that are similar to components or features having reference numerals preceded by the number "8" shown in FIGS. 8A through 8C, by the number "6" shown in FIGS. 6A through 6E, by the number "4" shown in FIGS. 4A through 4I, by the number "2" shown in FIG. 2 or by the number "1" shown in FIGS. 1A through 1D.

Figure 10A:
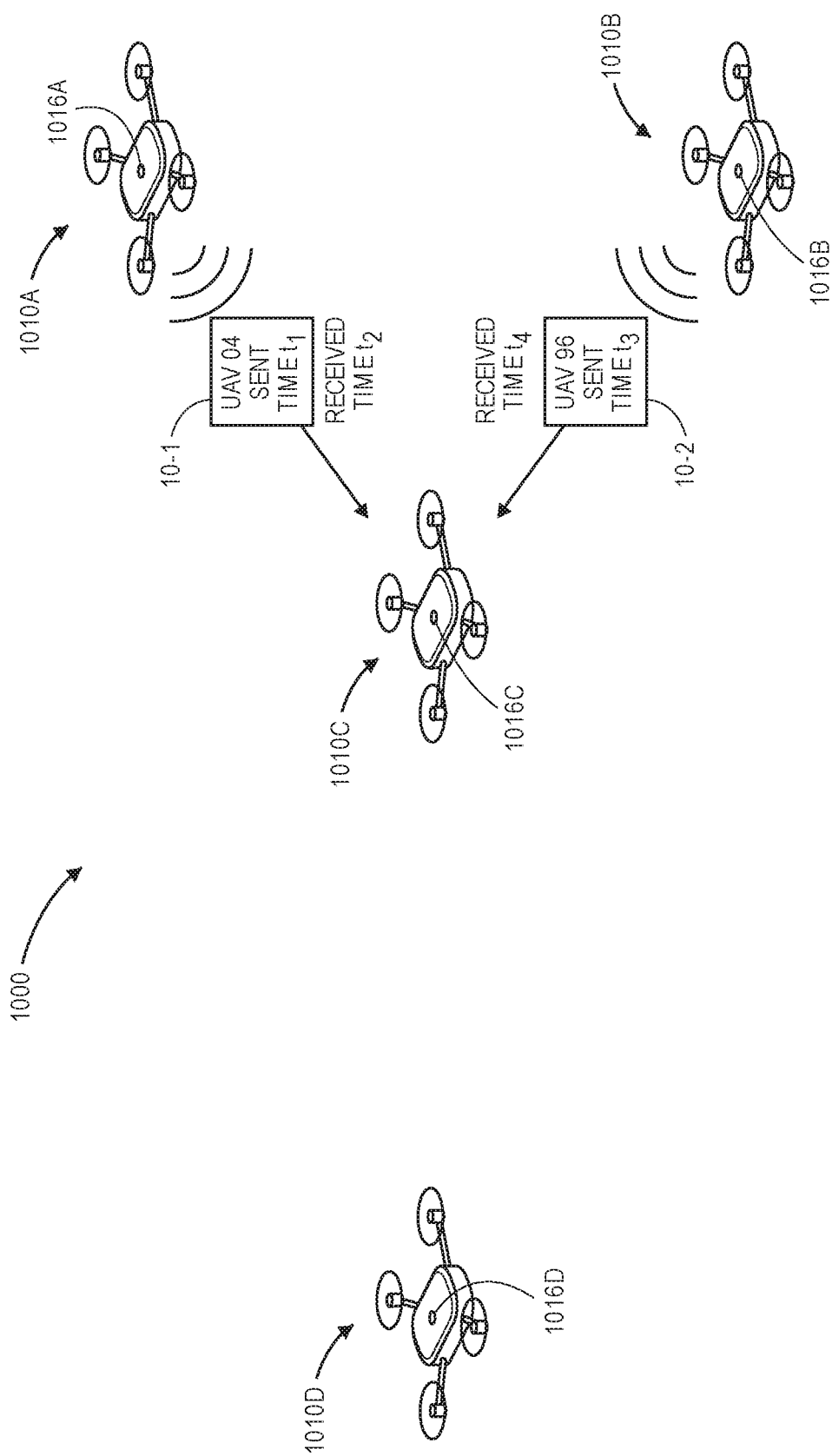
FIGS. 10A through 10D are views of aspects of one system for determining relative distances or orientations of vehicles based on times-of-flight of signals in accordance with embodiments of the present disclosure.

The system 1000 includes a plurality of aerial vehicles 1010A, 1010B, 1010C, 1010D. Each of the aerial vehicles 1010A, 1010B, 1010C, 1010D includes a transceiver 1016A, 1016B, 1016C, 1016D. As is shown in FIG. 10A, the aerial vehicle 1010A transmits a first signal 10-1 including a time stamp and an identifier of the aerial vehicle 1010A at time $t_1$. The aerial vehicle 1010B transmits a second signal 10-2 including a time stamp and an identifier of the aerial vehicle 1010B at time $t_3$. The first signal 10-1 and/or the second signal 10-2 may be electromagnetic signals of any type or form, e.g., radiofrequency signals, or light-based signals, having the time stamps and identifiers encoded therein. Alternatively, the first signal 10-1 and/or the second signal 10-2 may be acoustic signals having any intensity or residing within any frequency spectra. As is also shown in FIG. 10A, the aerial vehicle 1010C receives the first signal 10-1 at time $t_2$, and receives the second signal 10-2 at time $t_4$.

Figure 10B:
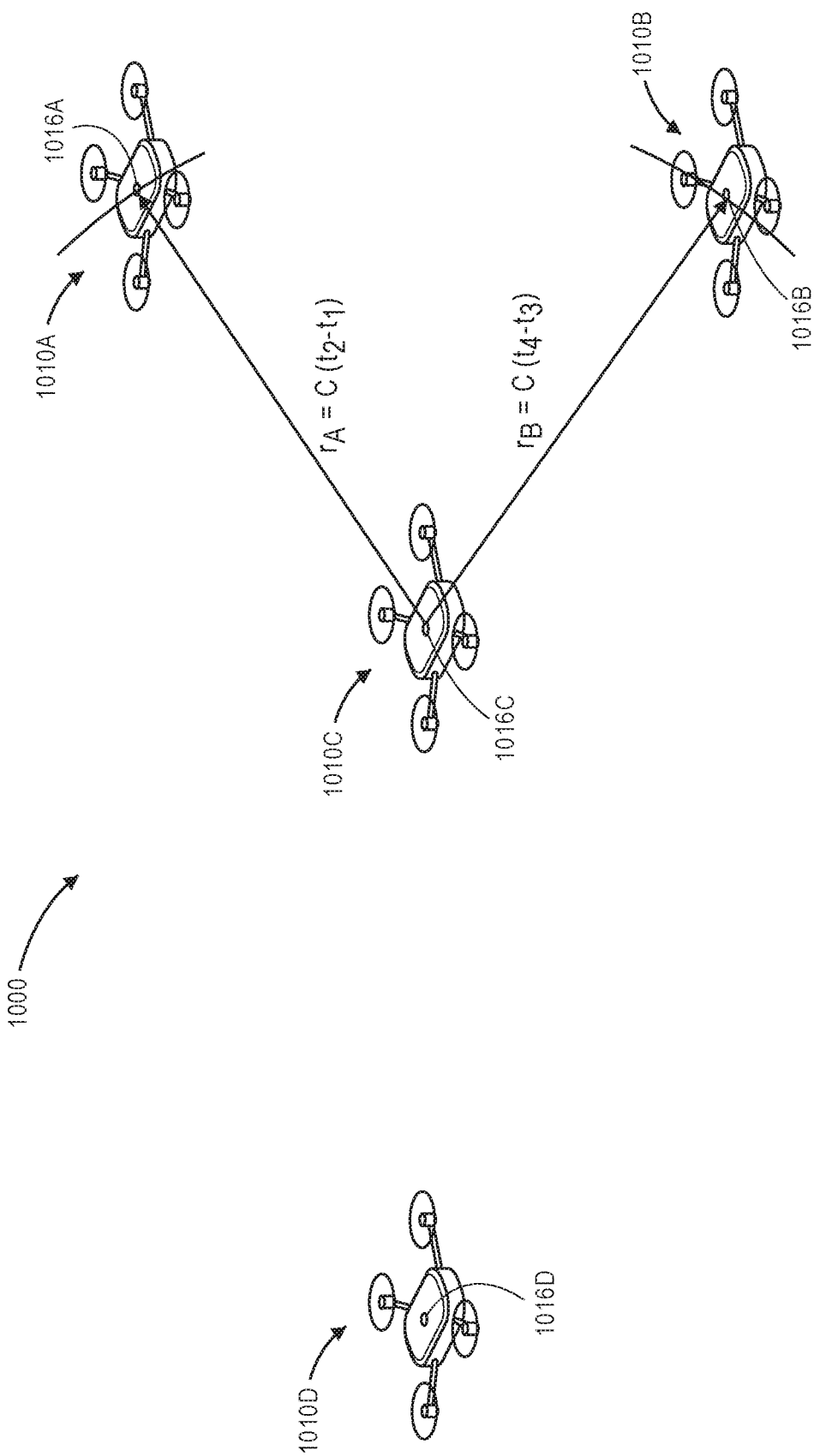

As is shown in FIG. 10B, based on the first signal 10-1 and the second signal 10-2, the aerial vehicle 1010C calculates relative distances $r_A$, $r_B$ to the aerial vehicles 1010A, 1010B, as products of the speed of light c and the differences between the times at which the first signal 10-1 and the second signal 10-2 were transmitted and received, or $(t_2-t_1)$ and $(t_4-t_3)$, respectively.

Figure 10C:
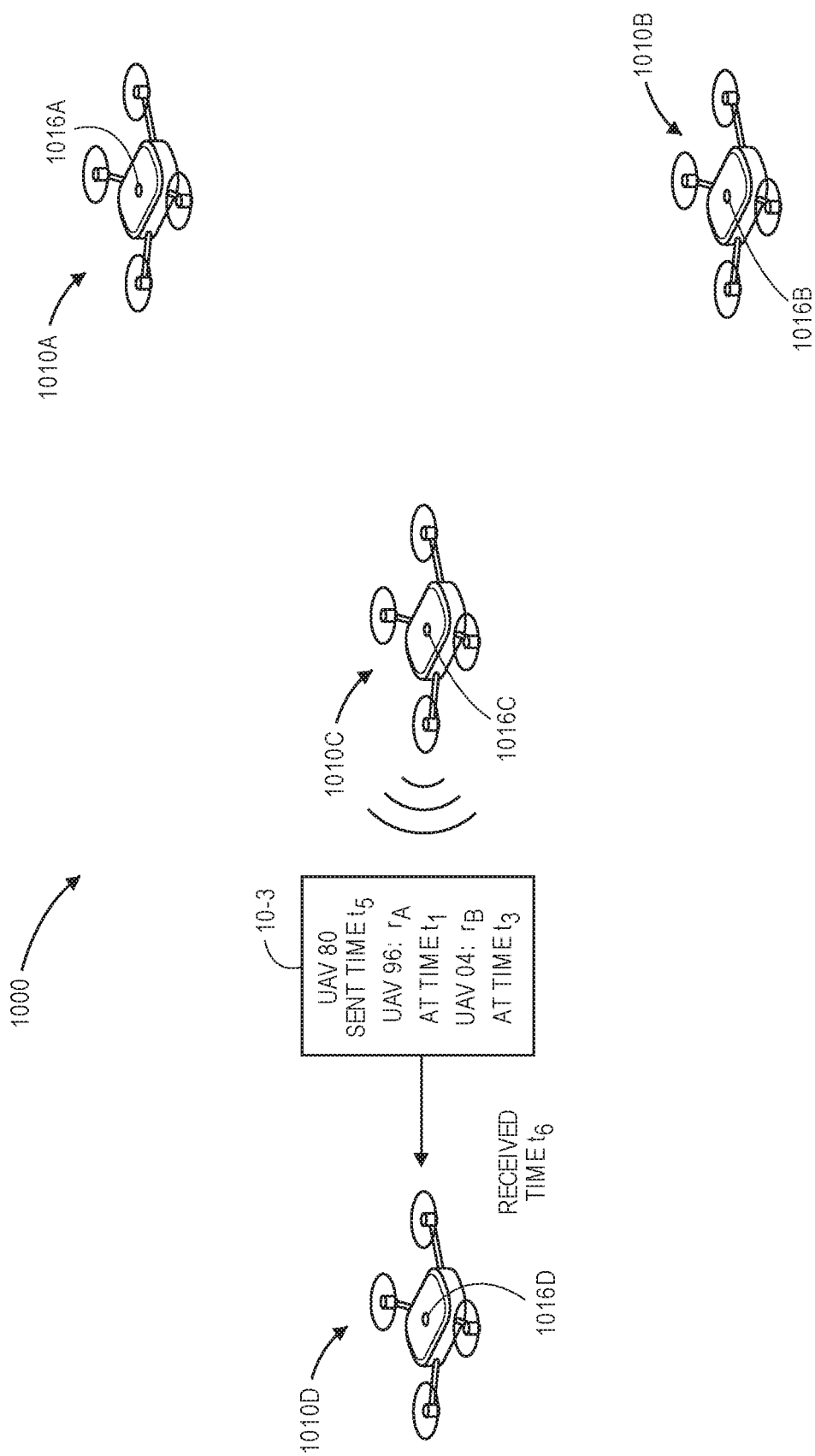

In accordance with some embodiments of the present disclosure, a vehicle, a station or an object may be configured to transmit a time-stamped signal that includes information or data regarding relative distances to any other vehicles, stations or objects, such as the signal 60E of FIG. 6E. As is shown in FIG. 10C, the aerial vehicle 1010C transmits a third signal 10-3 including a time stamp and an identifier of the aerial vehicle 1010C at time $t_5$. The third signal 10-3 further includes identifiers of the aerial vehicles 1010A, 1010B, the relative distances $r_A$, $r_B$ from the aerial vehicle 1010C to the aerial vehicles 1010A, 1010B, and the times $t_1$, $t_3$ at which the relative distances $r_A$, $r_B$ were determined. As is also shown in FIG. 10C, the aerial vehicle 1010D receives the third signal 10-3 at time $t_6$.

Figure 10D:
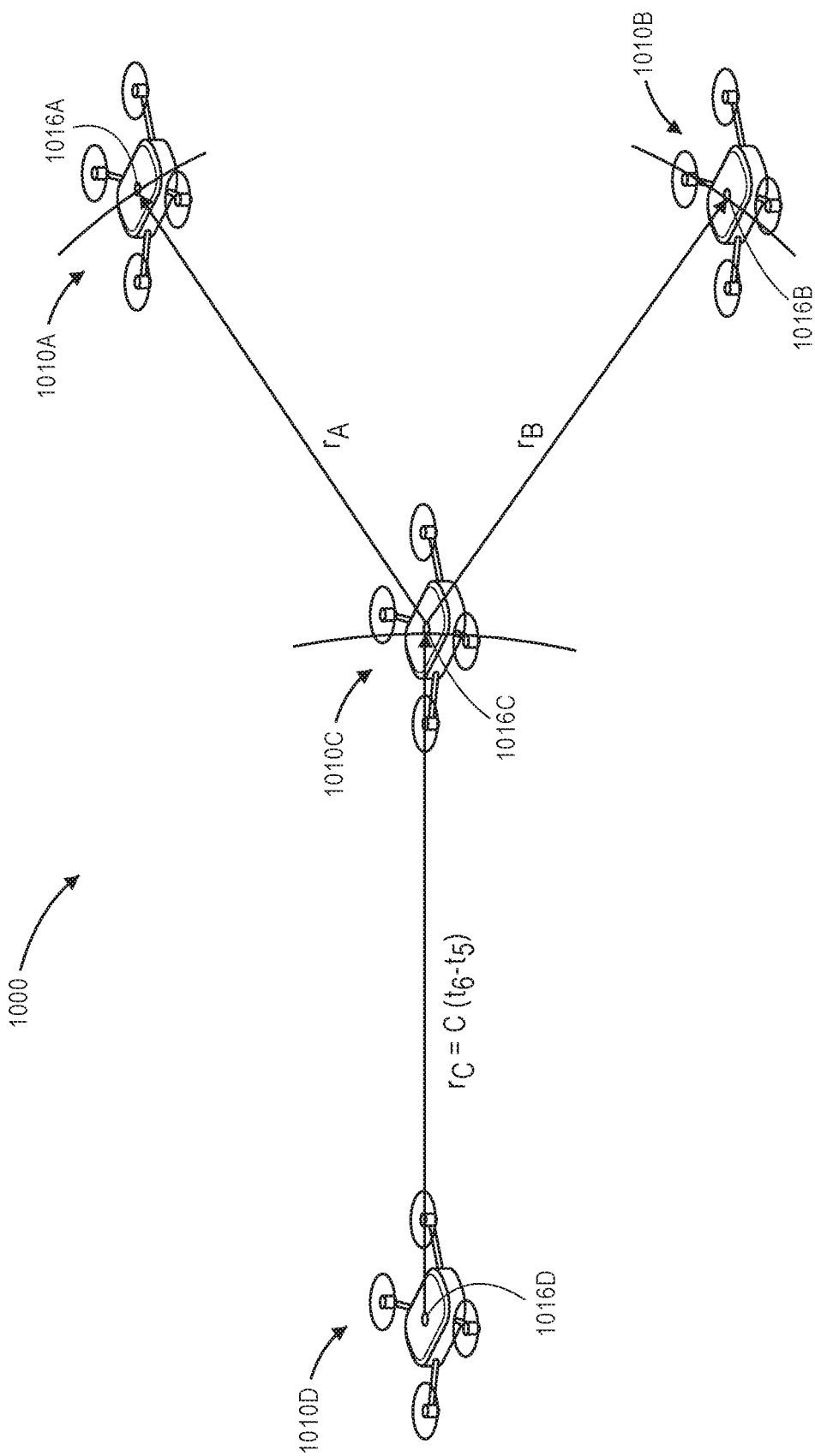

As is shown in FIG. 10D, based on the time $t_6$ at which the third signal 10-3 was captured, the aerial vehicle 1010D is able to determine a relative distance $r_C$ to the aerial vehicle 1010C, e.g., as a product of the speed of light c and the difference between the times at which the third signal 10-3 was transmitted and received, or $(t_6-t_5)$. Furthermore, upon interpreting the contents of the third signal 10-3, the aerial vehicle 1010D is also able to determine the relative distances $r_A$, $r_B$ from the aerial vehicle 1010C to the aerial vehicle 1010A and the aerial vehicle 1010B, respectively. From the relative distance $r_C$ and the relative distances $r_A$, $r_B$, relative distances from the aerial vehicle 1010D to the aerial vehicle 1010A and the aerial vehicle 1010B may also be determined.

As is discussed above, relative distances and/or orientations may be determined based on times-of-flight of signals transmitted and received by any type of object, including but not limited to aerial vehicles. For example, ground-based stations, orbiting satellites, mobile land-based, air-based or sea-based vehicles, or any other object, may be outfitted with one or more transmitting and/or receiving components that are configured to generate and transmit time-stamped signals at times determined by global clocks, and to receive and interpret such signals at times determined by global clocks. Based on the times-of-flight of such signals, and any other information or data encoded in such signals, relative distances, orientations, positions and/or velocities of objects outfitted with such components (e.g., vehicles, stations or other objects) may be determined.

Figure 11A:
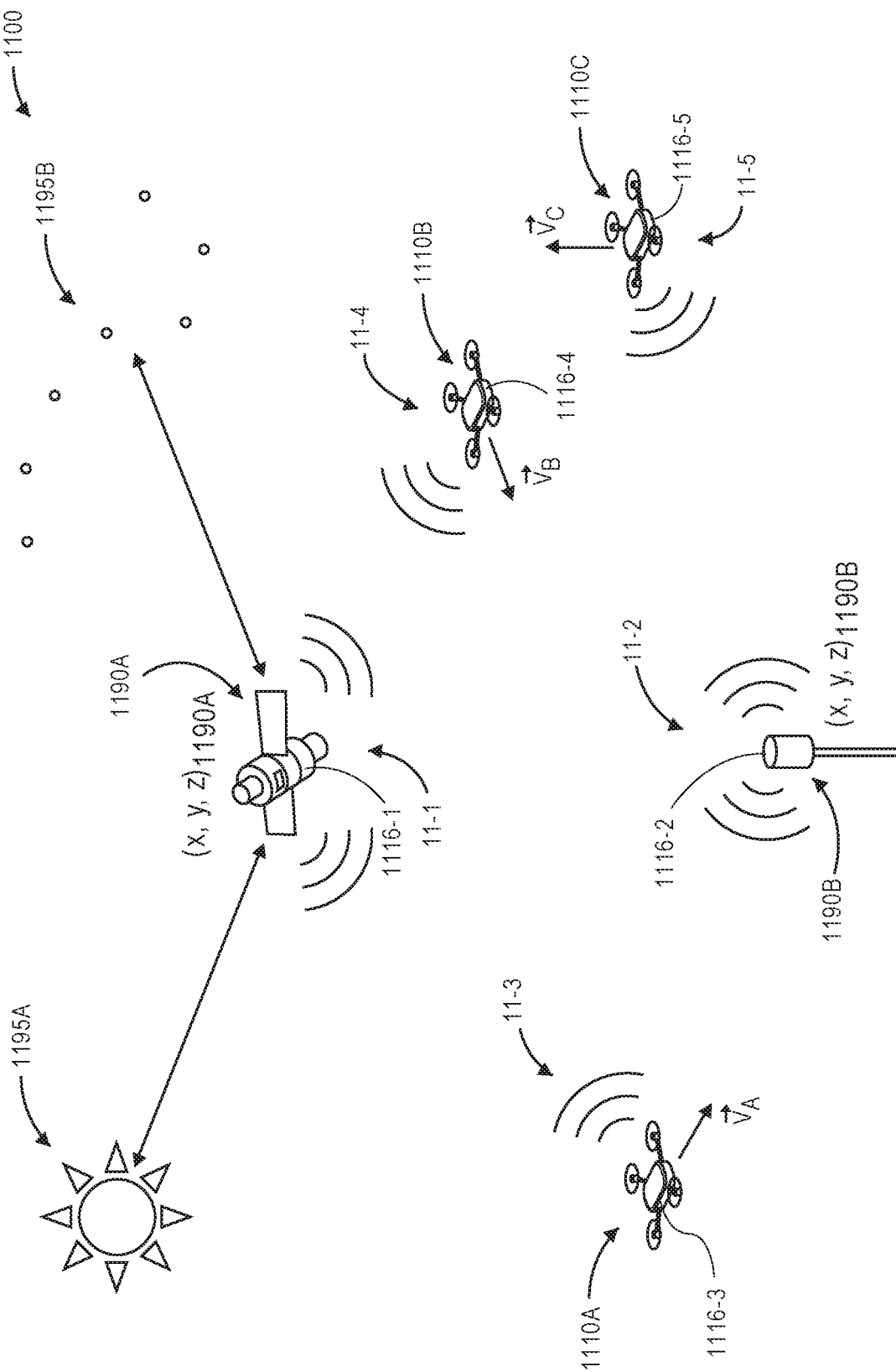
FIGS. 11A and 11B are views of aspects of one system for determining relative distances or orientations of vehicles based on times-of-flight of signals in accordance with embodiments of the present disclosure.
Figure 11B:
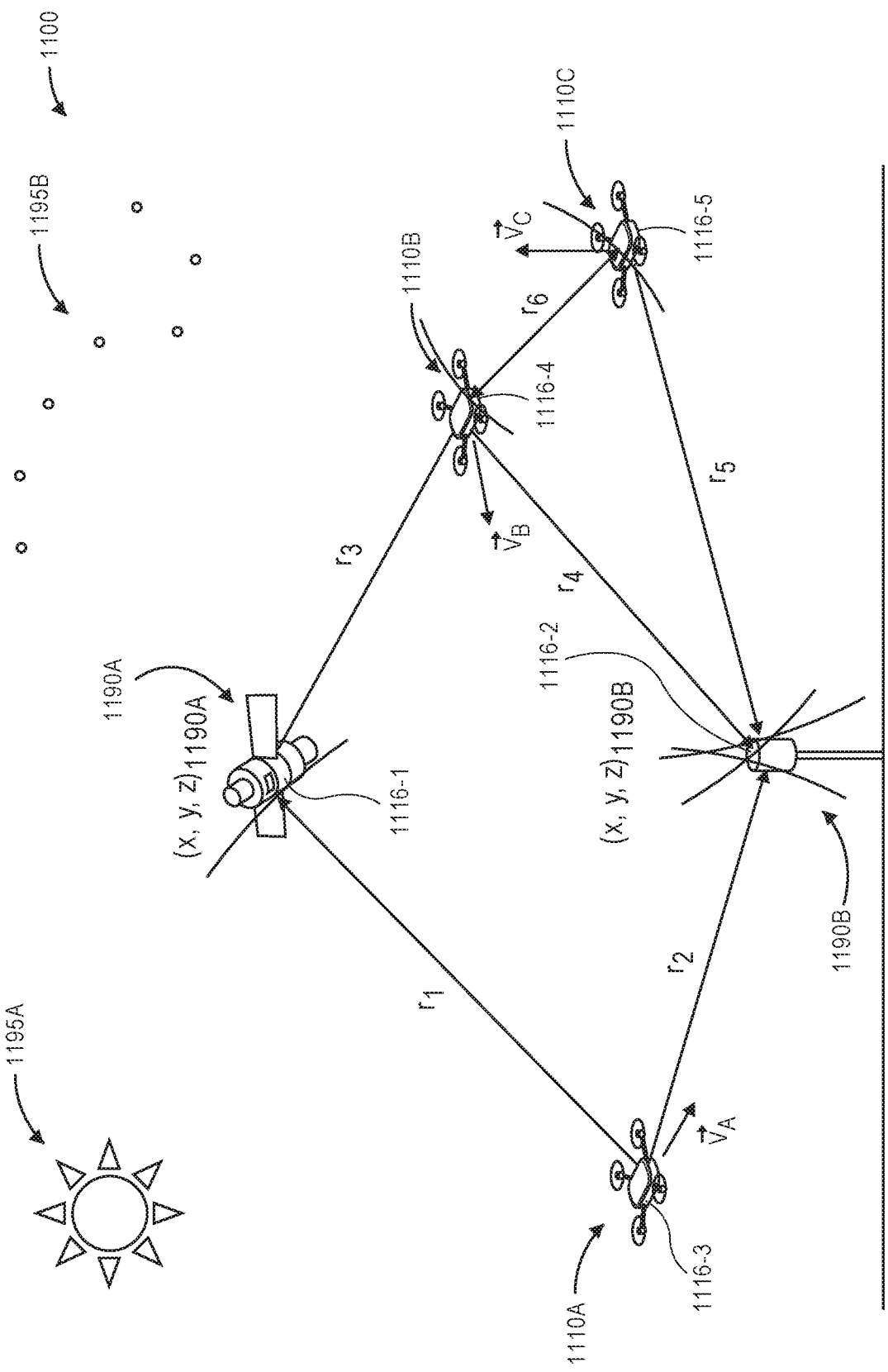

Referring to FIGS. 11A and 11B, views of aspects of one system 1100 for determining relative distances or orientations of vehicles based on times-of-flight of signals in accordance with embodiments of the present disclosure are shown. Except where otherwise noted, reference numerals preceded by the number "11" shown in FIGS. 11A and 11B indicate components or features that are similar to components or features having reference numerals preceded by the number "10" shown in FIGS. 10A through 10D, by the number "8" shown in FIGS. 8A through 8C, by the number "6" shown in FIGS. 6A through 6E, by the number "4" shown in FIGS. 4A through 4I, by the number "2" shown in FIG. 2 or by the number "1" shown in FIGS. 1A through 1D.

As is shown in FIG. 11A, the system 1100 includes a plurality of aerial vehicles 1110A, 1110B, 1110C, a mobile station 1190A and a fixed station 1190B. The mobile station 1190A shown in FIG. 11A is an orbiting satellite having one or more transceivers 1116-1 disposed thereon. Alternatively, the mobile station 1190A may be any other type or form of mobile object. The mobile station 1190A may be configured to determine its position $(x, y, z)_{1190A}$ from one or more celestial sources 1195A, 1195B (e.g., the Sun, or one or more moons, planets or stars). For example, the mobile station 1190A may be configured to capture images of the one or more celestial sources 1195A, 1195B and derive a position of the mobile station 1190A based on the captured images.

The fixed station 1190B shown in FIG. 11A is a beacon or other like feature mounted to a post or other ground-based structure having one or more transceivers 1116-2 disposed thereon. The fixed station 1190B may be programmed with position $(x, y, z)_{1190B}$ in any manner, e.g., based on information or data determined from the one or more celestial sources 1195A, 1195B, or from the mobile station 1190A. For example, the fixed station 1190B may be mounted to a single structure that provides support to the fixed station 1190B exclusively or, alternatively, to a structure that may be utilized for more than one purpose (e.g., a telephone pole, post or other like structure).

Each of the aerial vehicles 1110A, 1110B, 1110C includes a transceiver 1116-3, 1116-4, 1116-5. As is shown in FIG. 11A, the aerial vehicle 1110A is traveling at a velocity $V_A$, while the aerial vehicle 1110B is traveling at a velocity $V_B$, and the aerial vehicle 1110C is traveling at a velocity $V_C$.

As is shown in FIG. 11A, the transceivers 1116-1, 1116-2, 1116-3, 1116-4, 1116-5 are each transmitting signals 11-1, 11-2, 11-3, 11-4, 11-5, which may be transmitted according to the same standard or protocol, or according to different standards or protocols. For example, one or more of the signals 11-1, 11-2, 11-3, 11-4, 11-5 may be a radiofrequency signal such as a Wi-Fi signal, a Bluetooth® signal or another electromagnetic signal, as well as a visual light signal, or an acoustic signal, and may be captured and interpreted by any of the transceivers 1116-1, 1116-2, 1116-3, 1116-4, 1116-5 that are so configured. The signals 11-1, 11-2, 11-3, 11-4, 11-5 also may but need not include reciprocal information or data, or similar information or data. For example, one or more of the signals 11-1, 11-2, 11-3, 11-4, 11-5 may include merely a time stamp, such as the signal 60A of FIG. 6A, or a time stamp and an identifier of a vehicle and/or a transceiver, such as the signal 60B of FIG. 6B or the signal 60C of FIG. 6C. One or more of the signals 11-1, 11-2, 11-3, 11-4, 11-5 may further include a time stamp and information regarding a position, a course or a speed of a transceiver from which the signal was transmitted, such as the signal 60D of FIG. 6D, or information regarding vehicles and/or transceivers, relative distances to such vehicles and/or transceivers, and times at which such relative distances were determined, such as the signal 60E of FIG. 6E. The signals 11-1, 11-2, 11-3, 11-4, 11-5 may be transmitted randomly, at a predetermined time, in accordance with a predetermined schedule, or in response to receiving another signal, or on any other basis.

Each of the aerial vehicles 1110A, 1110B, 1110C, as well as the mobile station 1190A and the fixed station 1190B that receives one or more of the signals 11-1, 11-2, 11-3, 11-4, 11-5 may calculate a relative distance to a transceiver that transmitted the one or more signals by determining a time at which a signal was received according to a global time standard, and calculating the relative distance based on a product of a speed of the respective signal (e.g., the speed of light for an electromagnetic signal and/or an optical signal, or the speed of sound for an acoustic signal) and a difference between the time at which the signal was received and the time identified in the time stamp. For example, as is shown in FIG. 11B, the relative distance $r_1$ between the mobile station 1190A and the aerial vehicle 1110A may be calculated by the mobile station 1190A after receiving the signal 11-3, or by the aerial vehicle 1110A after receiving the signal 11-1. Similarly, the relative distance $r_2$ between the fixed station 1190B and the aerial vehicle 1110A may be calculated by the fixed station 1190B after receiving the signal 11-3, and by the aerial vehicle 1110A after receiving the signal 11-2. The relative distances $r_3$, $r_4$, $r_5$, $r_6$ may be calculated a similar manner by the mobile station 1190A, the fixed station 1190B, the aerial vehicle 1116-4 and/or the aerial vehicle 1116-5 after receiving the signals 11-1, 11-3, 11-4, 11-5.

Moreover, based on the contents of the signals 11-1, 11-2, 11-3, 11-4, 11-5, the aerial vehicles 1110A, 1110B, 1110C, the mobile station 1190A and the fixed station 1190B may also determine relative distances to and/or positions of one or more other vehicles or stations, even where such vehicles or stations are not within a signal range of the aerial vehicles 1110A, 1110B, 1110C, the mobile station 1190A or the fixed station 1190B. For example, where the aerial vehicle 1110B is aware of the relative distances $r_4$, $r_6$ to the fixed station 1190B and the aerial vehicle 1110C, e.g., upon receiving the signals 11-2, 11-5, the aerial vehicle 1110B may generate the signal 11-4, encode the relative distances $r_4$, $r_6$ therein, and transmit the signal 11-4 along with a time stamp. Upon receiving the signal 11-4, the mobile station 1190A may determine not only the relative distance $r_3$ to the aerial vehicle 1110B but also the relative distances $r_4$, $r_6$. Thus, even where the fixed station 1190B and/or the aerial vehicle 1110C are outside of a signal range of the mobile station 1190A, the mobile station 1190A may become aware of their existence, as well as their relative distances $r_4$, $r_6$ from the aerial vehicle 1110C or any other relevant information or data, upon receiving the signal 11-4 from the aerial vehicle 1110B.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

One or more of the embodiments disclosed herein may be utilized in any application in which accurate measures of relative distances between two objects are desired, particularly where the two objects are provided at substantially short ranges from one another. In this regard, one or more embodiments disclosed herein may be utilized by or in connection with two or more pedestrians, joggers, baby strollers, cyclists, autonomous mobile robots, automobiles, construction machines, spacecraft or other humans or machines (e.g., manned or unmanned vehicles), where relative distances to and/or orientations of other humans or machines are desired. For example, where two or more automobiles are outfitted with a plurality of transceivers, an automatic parallel parking system may rely on signals transmitted and received by such transceivers in determining relative distances and/or orientations during parallel parking evolutions based on the times-of-flight of such signals. Alternatively, where two or more autonomous mobile robots are performing picking, sorting or storage evolutions within a fulfillment center, a warehouse or a like facility, the autonomous mobile robots may be outfitted with one or more transceivers which may be configured to transmit and receive signals therebetween, and to determine relative distances and orientations based on the times-of-flight of such signals. Where two or more aircraft are configured for mid-flight refueling operations, e.g., where a military aircraft or jumbo jet prepares to mate with a tanker aircraft, a refueling boom, nozzle, probe, drogue, basket or other component on one aircraft, and a receptacle or other component on another aircraft, may be outfitted with one or more transceivers in accordance with the present disclosure. The respective components may determine their relative distances from one another, and their orientations with respect to one another, based on times-of-flight of signals transmitted therebetween. The types of devices to which such transceivers may be outfitted, and the applications in which one or more of the systems and methods disclosed herein may be utilized, are not limited by any of the individual embodiments disclosed herein.

Moreover, the systems and methods of the present disclosure may be utilized in environments where two or more objects are in motion, or where one or more objects is fixed in location, and where one or more objects is in motion. Each of the objects may be outfitted with one or more transmitting and/or receiving components, and relative distances between the one or more fixed objects and the one or more mobile objects, as well as orientations of the one or more fixed objects and the one or more mobile objects, may be determined based on the times-of-flight of signals transmitted between such components. The systems and methods of the present disclosure may operate based on times and time-stamps determined according to any global clock, or by any global time standard, and are not limited to the use of global clocks associated with the GPS system, namely, one or more atomic clocks disposed in orbiting GPS satellites.

As used herein, the terms "forward" flight or "horizontal" flight refer to flight in a direction substantially parallel to the ground (i.e., at a constant altitude with respect to sea level). As used herein, the term "vertical" flight refers to flight in a direction extending substantially radially outward from or inward toward a center of the Earth. Those of ordinary skill in the pertinent arts will recognize that flight trajectories may include components of both "forward" flight or "horizontal" flight and "vertical" flight vectors.

Although some of the embodiments disclosed herein may reference the use of unmanned aerial vehicles, e.g., for delivering payloads from warehouses or other like facilities to customers or other recipients, those of ordinary skill in the pertinent arts will recognize that the systems and methods disclosed herein are not so limited, and may be utilized in connection with any type or form of vehicle, station or other object in general, including any type or form of aerial vehicle (e.g., manned or unmanned) having fixed or rotating wings for any intended industrial, commercial, recreational or other use, as well as any other type or form of land-based, sea-based or air-based vehicle, station or object.

It should be understood that, unless otherwise explicitly or implicitly indicated herein, any of the features, capacities, attributes, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 5, 7 or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first unmanned aerial vehicle comprising:
an airframe;
a first transceiver mounted to the airframe, wherein the first transceiver is configured to transmit and receive one or more radiofrequency signals;
a Global Positioning System (GPS) sensor;
at least one memory component; and
at least one computer processor, wherein the at least one memory component has computer-executable instructions stored thereon that, when executed by the at least one computer processor, cause the first unmanned aerial vehicle to at least:
receive at least one GPS signal by the GPS sensor;
receive a first radiofrequency signal by the first transceiver;
determine that the first radiofrequency signal was received by the first transceiver at a first time according to a global time standard based at least in part on the at least one GPS signal;
determine that the first radiofrequency signal comprises:
an identifier of a second unmanned aerial vehicle;
a stamp of a second time according to the global time standard at which the first radiofrequency signal was transmitted by a second transceiver of the second unmanned aerial vehicle;
an identifier of a third unmanned aerial vehicle; and
a relative distance between the second unmanned aerial vehicle and the third unmanned aerial vehicle;
determine a relative distance between the first unmanned aerial vehicle and the second unmanned aerial vehicle based at least in part on a first time-of-flight of the first radiofrequency signal, wherein the first time-of-flight is a difference between the first time and the second time; and
determine a relative distance between the first unmanned aerial vehicle and the third unmanned aerial vehicle based at least in part on:
the relative distance between the first unmanned aerial vehicle and the second unmanned aerial vehicle; and
the relative distance between the second unmanned aerial vehicle and the third unmanned aerial vehicle.

2. The first unmanned aerial vehicle of claim 1, wherein the computer-executable instructions, when executed by the at least one computer processor, further cause the first unmanned aerial vehicle to at least:
determine a third time according to the global time standard based at least in part on the at least one GPS signal, wherein the third time follows the first time;
generate a second radiofrequency signal, wherein the second radiofrequency signal comprises:
an identifier of the first unmanned aerial vehicle;
a stamp of the third time;
the identifier of the second unmanned aerial vehicle;
the relative distance between the first unmanned aerial vehicle and the second unmanned aerial vehicle;
the identifier of the third unmanned aerial vehicle; and
the relative distance between the first unmanned aerial vehicle and the third unmanned aerial vehicle; and
transmit the second radiofrequency signal by the first transceiver at the third time.

3. The first unmanned aerial vehicle of claim 2, wherein the computer-executable instructions, when executed by the at least one computer processor, further cause the first unmanned aerial vehicle to at least:
receive a third radiofrequency signal by the first transceiver;
determine that the third radiofrequency signal was received by the first transceiver at a fourth time according to the global time standard based at least in part on the at least one GPS signal, wherein the fourth time precedes the third time;
determine that the third radiofrequency signal comprises:
an identifier of a fourth aerial vehicle; and
a stamp of a fifth time according to the global time standard at which the third radiofrequency signal was transmitted by a third transceiver of the fourth unmanned aerial vehicle, wherein the fifth time precedes the third time; and determine a relative distance between the first unmanned aerial vehicle and the fourth unmanned aerial vehicle based at least in part on a second time-of-flight of the third radiofrequency signal, wherein the second time-of-flight is a difference between the fourth time and a fifth time, and wherein the second radiofrequency signal further comprises:

the identifier of the fourth unmanned aerial vehicle; and
the relative distance between the first unmanned aerial vehicle and the fourth unmanned aerial vehicle.

4. The first unmanned aerial vehicle of claim 1, wherein the first radiofrequency signal is transmitted according to one of a Wireless Fidelity protocol or a Bluetooth protocol, and wherein the first radiofrequency signal has a frequency within a range of approximately three kilohertz to approximately three hundred gigahertz.

5. A method comprising:

receiving a first signal by at least a first transceiver of a first aerial vehicle at a first time, wherein the first time is determined according to a global time standard, and wherein the first signal comprises:

an indicator of a second time according to the global time standard, wherein the second time precedes the first time; and
an identifier associated with a second transceiver that transmitted the first signal at the second time;

determining, by at least one computer processor associated with the first aerial vehicle, a first distance from the first transceiver to the second transceiver based at least in part on a difference between the second time and the first time;

receiving a second signal by at least the first transceiver of the first aerial vehicle at a third time, wherein the third time is determined according to the global time standard, and wherein the second signal comprises:

an indicator of a fourth time according to the global time standard, wherein the fourth time precedes the third time; and
an identifier associated with a third transceiver;

determining, by the at least one computer processor associated with the first aerial vehicle, a second distance from the first transceiver to the third transceiver based at least in part on a difference between the third time and the fourth time;

generating a third signal by the at least one computer processor associated with the first aerial vehicle, wherein the third signal comprises:

an indicator of a fifth time according to the global time standard, wherein the fifth time follows each of the first time, the second time, the third time and the fourth time;
an identifier associated with at least one of the first transceiver or the first aerial vehicle;
the first distance;
an association of the first distance and the identifier associated with the second transceiver;
the second distance; and
an association of the second distance and the identifier associated with the third transceiver; and transmitting the third signal by the first transceiver of the first aerial vehicle at the fifth time.

6. The method of claim 5, wherein the first signal further comprises a position of the second transceiver at the second time, and wherein the method further comprises:

determining, by the at least one computer processor associated with the first aerial vehicle, a position of the first aerial vehicle at the fifth time based at least in part on the first distance and the position of the second transceiver at the second time, wherein the third signal further comprises the position of the first aerial vehicle at the fifth time.

7. The method of claim 5, wherein the second transceiver is associated with a second aerial vehicle, and wherein the method further comprises:

receiving the third signal by at least the second transceiver at a sixth time, wherein the sixth time is determined according to the global time standard; and
determining, by at least one computer processor associated with the second aerial vehicle, a third distance from the second transceiver to the first transceiver based at least in part on a difference between the sixth time and the fifth time.

8. The method of claim 7, further comprising:

determining, by the at least one computer processor associated with the second aerial vehicle, a fourth distance from the second transceiver to the third transceiver based at least in part on the third distance and the second distance.

9. The method of claim 7, further comprising:

generating a fourth signal by the at least one computer processor associated with the second aerial vehicle, wherein the fourth signal comprises:

an indicator of a seventh time according to the global time standard, wherein the seventh time follows each of the first time, the second time, the third time, the fourth time, the fifth time and the sixth time;
the identifier associated with the second transceiver;
the third distance; and
an association of the third distance and the identifier associated with the first second transceiver; and transmitting the fourth signal by the second transceiver of the second aerial vehicle at the seventh time.

10. The method of claim 9, further comprising:

receiving the fourth signal by at least the first transceiver at an eighth time, wherein the eighth time is determined according to the global time standard;
determining, by the at least one computer processor associated with the first aerial vehicle, a fourth distance from the first transceiver to the second transceiver based at least in part on a difference between the eighth time and the seventh time; and
determining, by the at least one computer processor associated with the first aerial vehicle, at least one of a course or a speed of the second aerial vehicle based at least in part on the first distance and the fourth distance.

11. The method of claim 7, wherein a sum of the third distance and the fourth distance is greater than a signal range of the third signal.

12. The method of claim 5, wherein the first signal is a radiofrequency signal having a frequency within a range of approximately three kilohertz to approximately three hundred gigahertz, and wherein determining the first distance from the first transceiver to the second transceiver based at least in part on the difference between the second time and the first time comprises:

multiplying the difference between the second time and the first time by a speed of light.

13. The method of claim 5, wherein the first signal is an acoustic signal, and
wherein determining the first distance from the first transceiver to the second transceiver based at least in part on the difference between the second time and the first time comprises:
multiplying the difference between the second time and the first time by a speed of sound in a medium between the first transceiver and the second transceiver.

14. The method of claim 5, wherein the second transceiver is associated with one of:
a ground-based station;
an orbiting satellite; or
a second aerial vehicle.

15. The method of claim 5, wherein the first aerial vehicle further comprises a Global Positioning System receiver having a clock, and
wherein receiving the first signal by at least the first transceiver of the first aerial vehicle at the first time comprises:
receiving, by the Global Positioning System receiver, a position signal comprising a sixth time determined by a global clock according to the global time standard, wherein the sixth time is prior to the first time;
synchronizing the clock to the sixth time determined by the global clock; and
determining that the first signal was received by at least the first transceiver of the first aerial vehicle at the first time based on the clock.

16. The method of claim 5, wherein the global time standard is one of:
Global Positioning System Time;
GLONASS Time;
Galileo System Time;
BeiDou Time;
International Atomic Time; or
Coordinated Universal Time.

17. A method comprising:
receiving, by at least one transceiver of a first aerial vehicle, a plurality of signals, wherein each of the plurality of signals comprises an indicator of a transmission time at which the signal was transmitted according to a global time standard, and wherein at least one of the plurality of signals was transmitted by at least one transceiver of a second aerial vehicle;
determining, by at least one processor of the first aerial vehicle, receipt times at which each of the plurality of signals was received by the at least one transceiver of the first aerial vehicle, wherein each of the receipt times is determined according to the global time standard;
calculating a first plurality of distances by the at least one processor aboard the first aerial vehicle, wherein each of the first plurality of distances is associated with one of the plurality of signals, and wherein each of the first plurality of distances is calculated based at least in part on a difference between the transmission time of the one of the plurality of signals and the receipt time of the one of the plurality of signals;
generating, by the at least one processor of the first aerial vehicle, a first signal comprising:
a first transmission time of the first signal according to the global time standard, wherein the first transmission time follows each of the receipt times;
an identifier of the first aerial vehicle; and
at least one of the first plurality of distances;
transmitting, by the at least one transceiver of the first aerial vehicle, the first signal at the first transmission time;
receiving the first signal by at least one transceiver of the second aerial vehicle;
determining, by at least one processor of the second aerial vehicle, a first receipt time at which the first signal was received by the at least one transceiver of the second aerial vehicle;
calculating a first distance between the first aerial vehicle and the second aerial vehicle by the at least one processor of the second aerial vehicle, wherein the first distance is calculated based at least in part on a difference between the first transmission time and the first receipt time; and
calculating a second plurality of distances by the at least one processor of the second aerial vehicle, wherein each of the second plurality of distances is associated with each of the at least one of the first plurality of distances, and wherein each of the second plurality of distances is calculated based at least in part on the first distance and one of the at least one of the first plurality of distances.

18. The method of claim 17, further comprising:
generating, by the at least one processor of the first aerial vehicle, a second signal comprising:
a second transmission time of the second signal according to the global time standard, wherein the second transmission time follows the first receipt time;
an identifier of the second aerial vehicle;
the first distance;
an association of the first aerial vehicle with the first distance; and
at least one of the second plurality of distances;
transmitting, by the at least one transceiver of the second aerial vehicle, the second signal at the second transmission time; and
receiving the second signal by the at least one transceiver of the first aerial vehicle.

19. The method of claim 17, wherein a first one of the plurality of signals comprises a position of a transceiver from which the first one of the plurality of signals was transmitted at a transmission time at which the one of the plurality of signals was transmitted, and
wherein the method further comprises:
determining, by the at least one processor of the first aerial vehicle, a first position of the first aerial vehicle based at least in part on the position of the transceiver from which the one of the plurality of signals was transmitted and the one of the first plurality of distances to the transceiver; and
determining, by the at least one processor of the first aerial vehicle, a first plurality of positions based at least in part on the first position of the first aerial vehicle and the plurality of signals, wherein each of the first plurality of positions is associated with a transceiver from which one of the plurality of signals was transmitted,
wherein the first signal further comprises:
the first position; and
at least one of the first plurality of positions.

20. The method of claim 17, wherein each of the first signal and at least one of the plurality of signals are radiofrequency signals, visible light signals or acoustic signals.

* * * * *